(12) United States Patent
Ikeda et al.

(10) Patent No.: US 9,223,305 B2
(45) Date of Patent: Dec. 29, 2015

(54) SEMICONDUCTOR MANUFACTURING SYSTEM

(75) Inventors: Gaku Ikeda, Nirasaki (JP); Koichi Miyashita, Nirasaki (JP); Takamasa Chikuma, Nirasaki (JP); Satoshi Gomi, Nirasaki (JP); Chunmui Li, Nirasaki (JP); Kunio Takano, Nirasaki (JP)

(73) Assignee: TOKYO ELECTRON LIMITED, Tokyo (JP)

(*) Notice: Subject to any disclaimer, the term of this patent is extended or adjusted under 35 U.S.C. 154(b) by 313 days.

(21) Appl. No.: 13/617,950

(22) Filed: Sep. 14, 2012

(65) Prior Publication Data

US 2013/0013240 A1 Jan. 10, 2013

Related U.S. Application Data

(63) Continuation of application No. PCT/JP2011/056238, filed on Mar. 16, 2011.

(30) Foreign Application Priority Data

Mar. 16, 2010 (JP) .................................. 2010-059885

(51) Int. Cl.
*G01N 21/88* (2006.01)
*G01N 21/75* (2006.01)
(Continued)

(52) U.S. Cl.
CPC .. *G05B 19/4065* (2013.01); *G05B 2219/32226* (2013.01)

(58) Field of Classification Search
CPC ........................................................ G05B 1/00
USPC ............... 702/81, 82, 85, 104, 183, 184, 188; 250/310; 257/773; 700/121
See application file for complete search history.

(56) References Cited

U.S. PATENT DOCUMENTS 5,883,437 A * 3/1999 Maruyama et al. ........... 257/773
6,745,096 B2 6/2004 Yamamoto et al.
(Continued)

FOREIGN PATENT DOCUMENTS

JP 4-104333 4/1992
JP 09-232200 9/1997
(Continued)

OTHER PUBLICATIONS

International Search Report issued Jun. 21, 2011 in PCT/JP2011/056238 filed Mar. 16, 2011 (with English translation).

*Primary Examiner* — Eliseo Ramos Feliciano
*Assistant Examiner* — Felix Suarez
(74) *Attorney, Agent, or Firm* — Oblon, McClelland, Maier & Neustadt, L.L.P.

(57) ABSTRACT

A semiconductor manufacturing system includes circuitry configured to execute: displaying a screen for selecting an inspection set including inspection items having a manipulation item and/or a check item; retrieving the inspection items, arranging the inspection items in the order of workflow, and displaying each inspection item on a screen with an execution attribute indicating whether each inspection item is "automatic" or "manual" execution; receiving an inspection start command and reading the first inspection item from a storage unit. The circuitry also executes steps corresponding to the following cases (a) to (d) until there are no more inspection items: (a) the read-out inspection item being the manipulation item and "automatic"; (b) the read-out inspection item being the manipulation item and "manual"; (c) the read-out inspection item being the check item and "automatic"; and (d) the read-out inspection item being the check item and "manual".

8 Claims, 22 Drawing Sheets

(51) Int. Cl.
*G01N 21/95* (2006.01)
*G06F 3/00* (2006.01)
*G05B 19/4065* (2006.01)

(56) References Cited

U.S. PATENT DOCUMENTS

| | | | |
|---|---|---|---|
| 7,062,347 | B2 | 6/2006 | Yamamoto et al. |
| 7,109,483 | B2 * | 9/2006 | Nakasuji et al. ............... 250/310 |
| 7,123,980 | B2 * | 10/2006 | Funk et al. .................... 700/121 |
| 2003/0019839 | A1 | 1/2003 | Yamamoto et al. |
| 2003/0201240 | A1 | 10/2003 | Yamamoto et al. |
| 2009/0313683 | A1 * | 12/2009 | Murakawa ........................ 726/5 |

FOREIGN PATENT DOCUMENTS

| | | |
|---|---|---|
| JP | 2003-45847 | 2/2003 |
| JP | 2003-59811 | 2/2003 |
| JP | 2007-335428 | 12/2007 |
| JP | 2008-123256 | 5/2008 |
| JP | 2008-270817 | 11/2008 |

\* cited by examiner

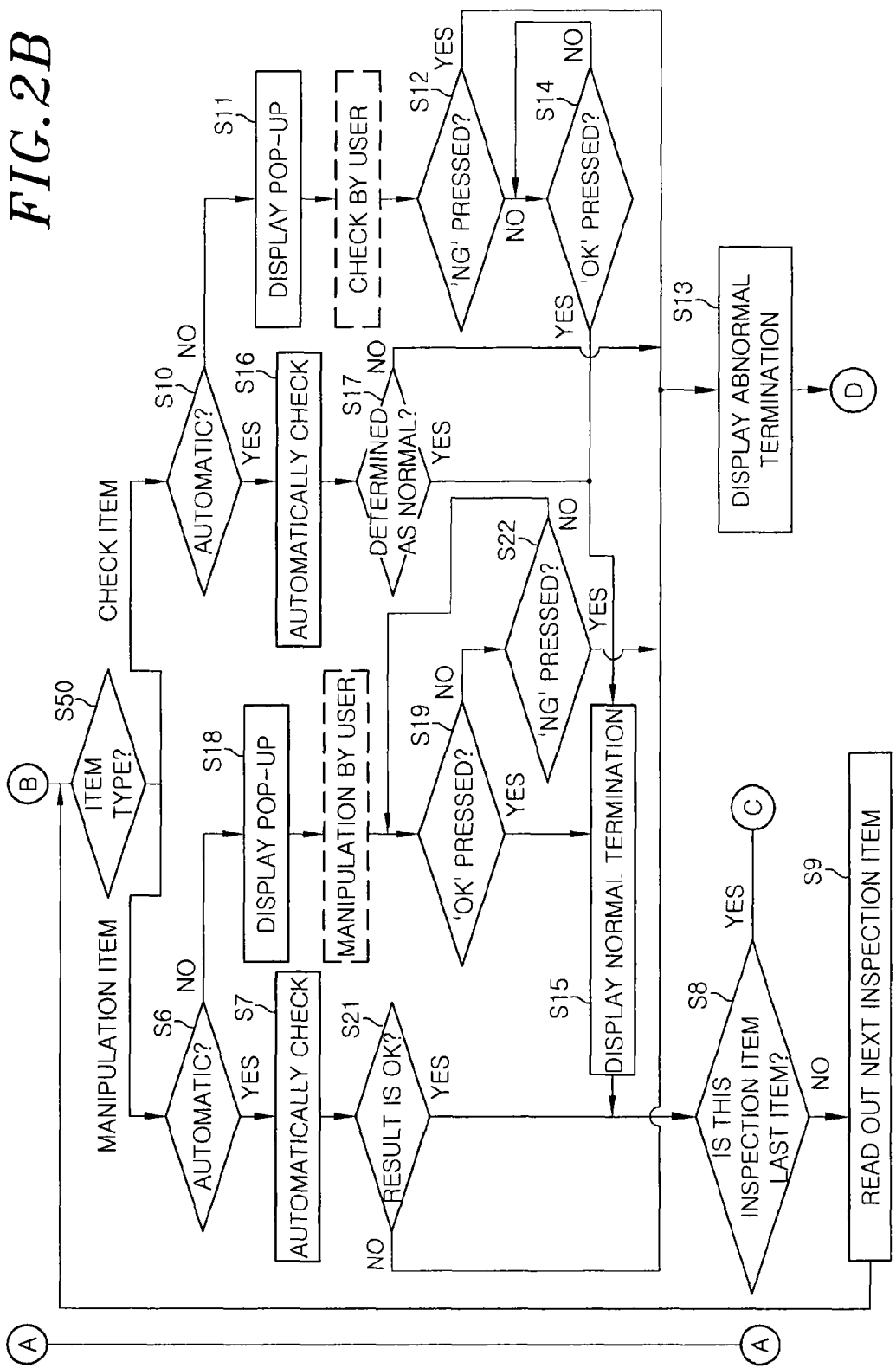

FIG.5

| | EXECUTION ATTRIBUTE | INSPECTION ITEMS | DETERMINATION (NORMAL/ABNORMAL) |
|---|---|---|---|
| 1 | AUTOMATIC | A4 B4 | |
| 2 | MANUAL | A5 | |
| 3 | AUTOMATIC | B5 | |
| 4 | AUTOMATIC | A6 B6 | |
| 5 | MANUAL | B'6 | |

INSPECTION SET OOO

[EXECUTE] [STOP]

FIG. 9

| PM1 INTERLOCK CHECK DOCUMENT NO | | | |
|---|---|---|---|
| NO. | INSPECTION SET | INSPECTION END TIME | DETERMINATION |
| 1 | OUTPUT POWER ON | | |
| 2 | EXTERNAL INTERLOCK LEVEL 1 (CUSTOMER SIGNAL ACCESS) | | |
| 3 | EXTERNAL INTERLOCK LEVEL 1 (NO CUSTOMER SIGNAL ACCESS) | | |
| 4 | EXTERNAL INTERLOCK LEVEL 2 (OPERATE ONLY WHEN CUSTOMER SIGNAL ACCESS) | | |
| 5 | EXTERNAL INTERLOCK LEVEL 3 (OPERATE ONLY WHEN CUSTOMER SIGNAL ACCESS) | | |
| 6 | GATE VALVE CLOSE (GRADE GAS VALVE CLOSE) | | |
| 7 | VEP1 CLOSE (GRADE GAS VALVE CLOSE) | | |
| 8 | DEPOSITION GAS VALVE CLOSE | | |
| 9 | CLEANING GAS VALVE CLOSE | | |
| 10 | RF GENERATOR MC OFF | | |
| 11 | MOTOR STOP EMO | | |
| 12 | SCRUBBER ABNORMALITY | | |
| 13 | ROUGHING PUMP STOP | | |
| 14 | SCRUBBER CLEANING | | |

[ END ] [ BATCH EXECUTION ] [ DETAIL ] [ CSV PRESERVE ] [ DETERMINATION CLEAR ]

⇨ PRESS "DETAIL"

FIG. 10

PM1 INTERLOCK CHECK
OUTPUT POWER ON

| INSPECTION STEP | | START TIME | | |
| | | END TIME | | |
| | STEP | INSPECTION ITEM | DETECTION VALUE | DETERMINATION |
| MANUAL | 1 | THIS INSPECTION ITEM IS TO CHECK WHETHER MODULE IS DRIVEN AND WHETHER IT IS BEFORE PUMP IS OPERATED | | |
| AUTO | 2 | SET 0 TO OUTPUT POWER ON | | |
| MANUAL | 3 | ALARM HAS BEEN RINGING | | |
| AUTO | 4 | MESSAGE SAYING "VOLTAGE DECREASE (OF GAS PRINTED CIRCUIT BOARD (+ 24V)) IS DETECTED" IS DISPLAYED | | |
| AUTO | 5 | MESSAGE SAYING "VOLTAGE DECREASE (OF GAS PRINTED CIRCUIT BOARD (+ 5V)) IS DETECTED" IS DISPLAYED | | |
| AUTO | 6 | MESSAGE SAYING "VOLTAGE DECREASE (OF GAS PRINTED CIRCUIT BOARD (+ 15V)) IS DETECTED" IS DISPLAYED | | |

END   EXECUTE

FIG. 19

PM1 I/O CHECK
DOCUMENT NO

| NO. | INSPECTION SET | INSPECTION END TIME | DETERMINATION |
|---|---|---|---|
| 1 | CCI SLAVE<br>CHECK OUTPUT OF PM READY SIGNAL<br>CHECK OUTPUT OF MC HARD READY SIGNAL<br>CHECK OUTPUT OF MC SOFT READY SIGNAL | | |
| 2 | CHECK OUTPUT OF EMO SIGNAL | | |
| 41-2 | VALVE OPERATION OF GAS LINE 4<br>[OPTION]<br>(INCLUDING REGULATOR) | | |
| 42-1 | | | |

[END] [BATCH EXECUTION] [DETAIL] [CSV PRESERVE] [DETERMINATION CLEAR]

⇨ SELECT '41-2' AND PRESS 'DETAIL'

FIG. 20

PM1 I/O CHECK
VALVE OPERATION OF GAS LINE 4

| INSPECTION STEP | | START TIME | | |
| --- | --- | --- | --- | --- |
| | | END TIME | | |
| | STEP | INSPECTION ITEM | DETECTION VALUE | DETERMINATION |
| AUTO | 1 | SUPPLY GAS AT MAX. FLOW RATE INTO GAS LINE 4 FOR 10 SEC | | |
| AUTO | 2 | CHECK WHETHER GAS HAS FLOWN TO GAS LINE 4 AT SET FLOW RATE | | |
| AUTO | 3 | MAINTAIN STATE OF STEP NO. 1 | | |
| MANUAL | 4 | CHECK WHETHER PRESSURE CAN BE ADJUSTED BY REGULATOR AND WHETHER PRESSURE IS DISPLAYED ON DISPLAY DEVICE | | |
| MANUAL | 5 | CLOSE REGULATOR AND CHECK WHETHER PRESSURE ON DISPLAY DEVICE BECOMES MINUS VALUED | | |
| MANUAL | 6 | IS IT CHECKED PRESSURE VALUE ON DISPLAY DEVICE IS IN NORMAL RANGE BY ADJUSTING REGULATOR | | |
| MANUAL | 7 | CHECK WHETHER DISPLAYED PRESSURE IS IN NORMAL RANGE | | |
| AUTO | 8 | SUPPLY PURGE GAS AT A MAX. FLOW RATE INTO GAS LINE 4 FOR 10 SEC | | |
| AUTO | 9 | CHECK WHETHER GAS HAS FLOWN INTO GAS LINE 4 AT SET FLOW RATE | | |
| AUTO | 10 | SET FLOW RATE OF GAS LINE 4 TO BE ZERO AND CLOSE VALVE | | |

END   EXECUTE

PRESS "OK"

PRESS "OK"

SEMICONDUCTOR MANUFACTURING SYSTEM

This application is a Continuation Application of PCT International Application No. PCT/JP2011/056238 filed on Mar. 16, 2011, which designated the United States.

FIELD OF THE INVENTION

The present invention relates to a semiconductor manufacturing system including a program for inspecting a semiconductor manufacturing apparatus.

BACKGROUND OF THE INVENTION

For example, when performing an inspection process before a semiconductor manufacturing apparatus is shipped or when performing maintenance of the semiconductor manufacturing apparatus by a user, the content of the inspection operation is previously defined in order to improve safety of the apparatus and an operator, and to improve processing efficiency while guaranteeing the quality of the apparatus. Specifically, the inspection operation may include manipulating component devices of the semiconductor manufacturing apparatus or checking the result of the manipulation.

Examples of the inspection operation may be as follows:

(a) operating a valve by pressing a switch (soft switch) on a manipulation panel (manipulation screen) provided in the apparatus, and supplying a gas at a maximum flow rate in a gas line, observing a flowmeter with naked eyes of the operator and checking whether the gas of the set flow rate is being flown, (b) adjusting a pressure by manipulating a regulator of a gas cylinder and checking the pressure on a display device provided on a manipulation equipment of the regulator.

Actually, other inspection items follow these inspection items. There are prepared a multiple number of inspection sets, each of which includes such inspection items.

The sequence of these inspection operations is written on a workflow chart, and the operator manipulates the devices through the manipulation screen by referring to the workflow chart. Further, the operator may perform a series of operations involving checking whether a determination result on the screen coincides with a determination result on the workflow chart, manipulating the devices and checking the operational status of the devices after going to a place where the devices are installed.

In such an inspection method, however, the operator needs to check a manipulation list or a check list based on the workflow chart. Further, when manipulating a device through the manipulation screen, the operator needs to select a corresponding manipulation item on the screen. Accordingly, since the operator needs to pay great attention, it may impose a burden on the operator. Further, a manipulation error is easily likely to occur.

Further, when there are mixed manipulation/checkup operations to be performed through the screen and manipulation/checkup operations to be performed directly or manually by the operator, a series of inspection operations may not be performed with high efficiency and it may take great time to complete the inspection.

Moreover, recently, as for the semiconductor manufacturing apparatus, it is more strongly demanded to reduce environment load. Since, however, the workflow chart for the conventional inspection operation is printed on a paper, a load on the environment is caused.

Japanese Patent Application Publication No. H9-232200 discloses a technique of displaying an operational status and a command corresponding to a module on the same screen, thus allowing repair of the apparatus to be implemented. Further, Japanese Patent Application Publication No. 2003-59811 describes a repair method of automatically performing inspection by selecting or executing manipulation files in which manipulation operations are written. Neither of these documents, however, mentions anything about the aforementioned problems.

SUMMARY OF THE INVENTION

In view of the foregoing problem, the present invention provides a semiconductor manufacturing system capable of inspecting a semiconductor manufacturing apparatus efficiently while imposing little burden on an operator or the environment and hardly accompanying an operation error.

In accordance with an embodiment of the present invention, there is provided a semiconductor manufacturing system including: a semiconductor manufacturing apparatus including a device; a control unit configured to output a control signal for controlling the device included in the semiconductor manufacturing apparatus; a storage unit that stores a plurality of inspection sets each of which includes a plurality of inspection items having at least one of a manipulation item and a check item for inspecting the semiconductor manufacturing apparatus; a program storage that stores therein a program for inspecting the semiconductor manufacturing apparatus; a display configured to display a screen for inputting an instruction for an inspection operation and checking the inspection operation; and a detector configured to detect a manipulation result of the manipulation item.

Further, the program is configured to execute: a step of displaying a screen for selecting one of the inspection sets; a step of retrieving inspection items belonging to the selected one of the inspection sets, arranging the retrieved inspection items in the order of workflow, and displaying the retrieved inspection items on a screen along with an execution attribute of each of the retrieved inspection items indicating whether the corresponding retrieved inspection item is to be processed under an automatic execution or under an manual execution; a step of receiving an inspection start command and reading out, from the storage unit, the first inspection item among the retrieved inspection items that are arranged in order, and the program also executes one of the following steps (a) to (d) until there remains no more next inspection item:

(a) when the read-out inspection item is the manipulation item and is to be processed under the automatic execution, outputting a command for implementing an operation corresponding to the manipulation item to a manipulation target device and reading out a next inspection item among the retrieved inspection items from the storage unit;

(b) when the read-out inspection item is the manipulation item and is to be processed under the manual execution, displaying a screen for receiving an input indicating that the manipulation item is executed by a user and reading out a next inspection item among the retrieved inspection items from the storage unit by receiving the input;

(c) when the read-out inspection item is the check item and is to be processed under the automatic execution, automatically executing the check item based on a detection result of the corresponding check item from the detector and displaying a checkup result on the screen on which the retrieved inspection items are displayed in a corresponding relationship with the check item; and (d) when the read-out inspection item is the check item and is to be processed under the manual execution, displaying a screen for receiving an input of determining whether a checkup result is normal or abnormal and displaying a screen showing the inputted checkup result in a corresponding relationship with the check item.

In accordance with the present invention, when performing the inspection of the semiconductor manufacturing apparatus, manipulation items and/or check items for inspection are displayed on the screen for each inspection set while arranged in the previously set order of workflow. Further, it is also displayed whether each inspection item (manipulation item and/or check item) is to be processed under the automatic execution or under the manual execution. Under the automatic execution, the inspection item is automatically executed. On the other hand, under the manual execution, a screen for receiving an input indicating that the manipulation item is executed or a screen for receiving an input of a checkup result is displayed. After the input thereof is received, a next inspection item is read out from the storage unit (when the currently processed inspection item is not the last inspection item). In this way, the inspection items are executed in order.

That is, since the screen serves as a navigator and the inspection item which is subjected to the automatic execution is automatically processed, occurrence of an operation error can be prevented remarkably and the inspection operation can be performed very efficiently.

Further, in accordance with the present invention, the inspection operation that has been conventionally performed based on a workflow chart printed on a paper is computerized. Thus, load on the environment can be reduced.

Further, it is preferable that, in the step (c), when the checkup result is normal and there exists a next inspection item, the next inspection item is read out.

Further, it is preferable that, in the step (d), when the inputted checkup result is normal and there exists a next inspection item, the next inspection item is read out.

Further, it is preferable that the screen for receiving the input indicating that the manipulation item is executed by the user in the step (b) and the screen for receiving the input of determining whether the checkup result is normal or abnormal in step (d) are displayed on a pop-up window.

Further, it is preferable that, in the step (c), when the checkup result is abnormal, inspection items belonging to another one of the inspection sets, which is previously set, are read out from the storage unit and arranged in order and, then, the respective steps are executed.

BRIEF DESCRIPTION OF THE DRAWINGS

FIGS. 2A to 2C are a flowchart for describing a processing sequence of a program for inspecting a semiconductor manufacturing apparatus in the semiconductor manufacturing system.

FIG. 5 is a schematic view showing an example screen displayed during the program execution.

FIG. 9 is a schematic view showing an example screen displayed during the program execution.

FIG. 10 is a schematic view showing an example screen displayed during the program execution.

FIG. 19 is a schematic view showing an example screen displayed during the program execution.

FIG. 20 is a schematic view showing an example screen displayed during the program execution.

DETAILED DESCRIPTION OF THE EMBODIMENTS

Figure 1:
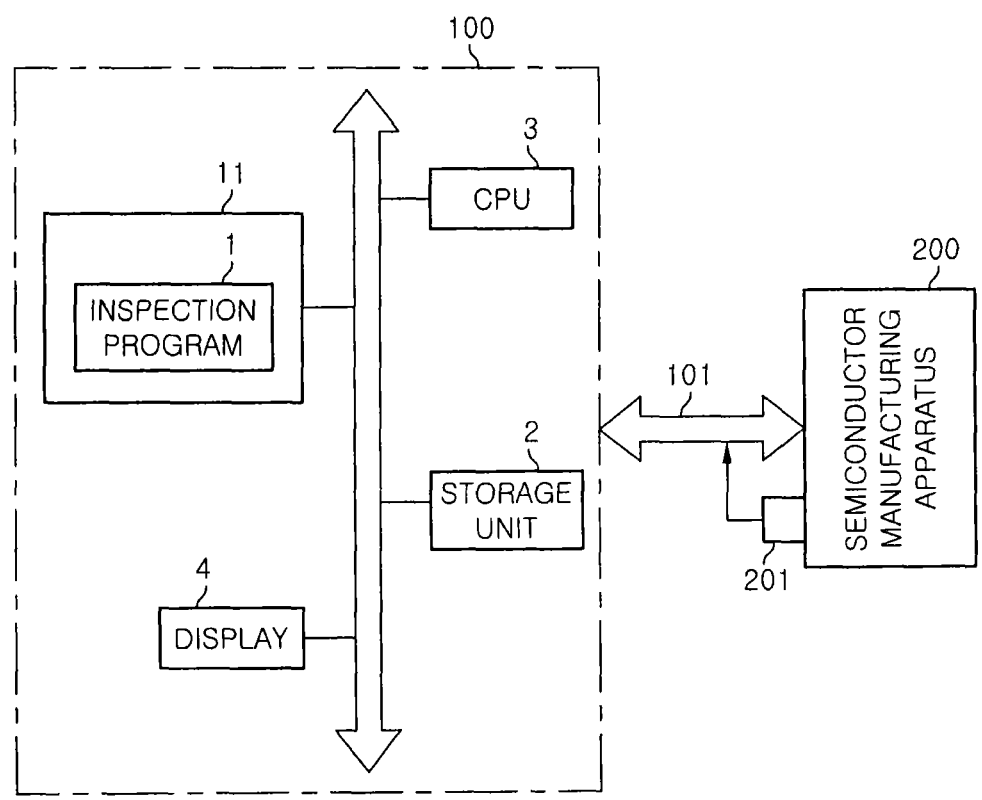
FIG. 1 is a schematic view illustrating a semiconductor manufacturing system in accordance with a first embodiment of the present invention.

FIG. 1 is a schematic diagram showing an overall configuration of a semiconductor manufacturing system in accordance with a first embodiment of the present invention. In FIG. 1, a reference numeral '100' denotes a control unit including a computer and a reference numeral '200' represents a semiconductor manufacturing apparatus controlled by the control unit 100. The control unit 100 includes a program storage 11 in which an inspection program 1 is stored and also includes a storage unit 2, a CPU 3 and a display 4. The control unit 100 may include a computer provided for each semiconductor manufacturing apparatus or a host computer for controllers of a plurality of semiconductor manufacturing apparatuses. The control unit 100 outputs a control signal for controlling devices in the semiconductor manufacturing apparatus 200 through a signal line 101. A detector 201 in the semiconductor manufacturing apparatus 200 sends a measurement result and a detection result indicating an operational status of each component to the control unit 100 through the signal line 101.

The semiconductor manufacturing apparatus 200 may include various apparatuses that are necessary to manufacture a semiconductor device chip by performing various processes on a semiconductor wafer. By way of non-limiting example, the semiconductor manufacturing apparatus 200 may include an apparatus for forming a circuit on a glass substrate for a flat panel display. To be more specific, the semiconductor manufacturing apparatus 200 may include a plasma etching apparatus, a plasma CVD apparatus, a thermal CVD apparatus and a sputtering apparatus that are configured as vacuum processing apparatuses and also include a so-called multi-chamber system having a multiple number of vacuum chambers, a vertical thermal processing apparatus configured as a batch furnace, a resist coating apparatus for forming a resist pattern, a developing apparatus, an exposure apparatus, and so forth.

The detector 201 may be configured to detect a status of each device in the semiconductor manufacturing apparatus 200 or may be configured to detect a physical amount. A detector of the former type may include, but not limited to, a detector for detecting an opened/closed state of a valve, a detector for detecting an ON/OFF state of a sensor, a detector for detecting presence or absence of a flag of data outputted from each device, and so forth. A detector of the latter type may include, but not limited to, a voltage detector, a gas flow rate detector, a temperature detector, a pressure detector, and so forth. Since the detector 201 is used during the operation of the semiconductor manufacturing apparatus 200, it is required to check whether the detector 201 is operating accurately before the semiconductor manufacturing apparatus 200 is shipped or after maintenance thereof is performed.

In the present embodiment, manipulation items and check items for inspecting the semiconductor manufacturing apparatus 200 are all defined as inspection items. Inspection sets each of which includes a multiple number of inspection items are stored in the storage unit 2 of the control unit 100. The inspection sets are specified in FIG. 9, for example. An inspection set refers to one set of inspection items for inspecting a certain operation of an inspection target device (see FIG. 10). Further, these inspection sets are classified into inspection categories. For example, the inspection sets shown in FIG. 9 are grouped into one of inspection categories specified in FIG. 8. That is, in this case, one inspection category is selected from the plural inspection categories, and one inspection set is selected from the plural inspection sets included in the selected inspection category. Accordingly, tree-structure data including inspection categories, inspection sets and inspection items in hierarchy are stored in the storage unit 2. This data will be more clearly explained later with reference to a flowchart shown in FIGS. 2A to 2C.

The display 4 may include a CRT display device or a liquid crystal panel. Through a screen having a function of an input device such as a touch panel, a mouse or a track ball, a user can manipulate the apparatus and make determinations.

The inspection program 1 and the data stored in the storage unit 2 are included in a software. This software is installed in the control unit 100 from a storage medium. The inspection program 1 includes step sets for allowing the user to operate navigation for inspection by displaying inspection items (manipulation items and check items) included in the selected inspection set on the screen.

Figure 2A:
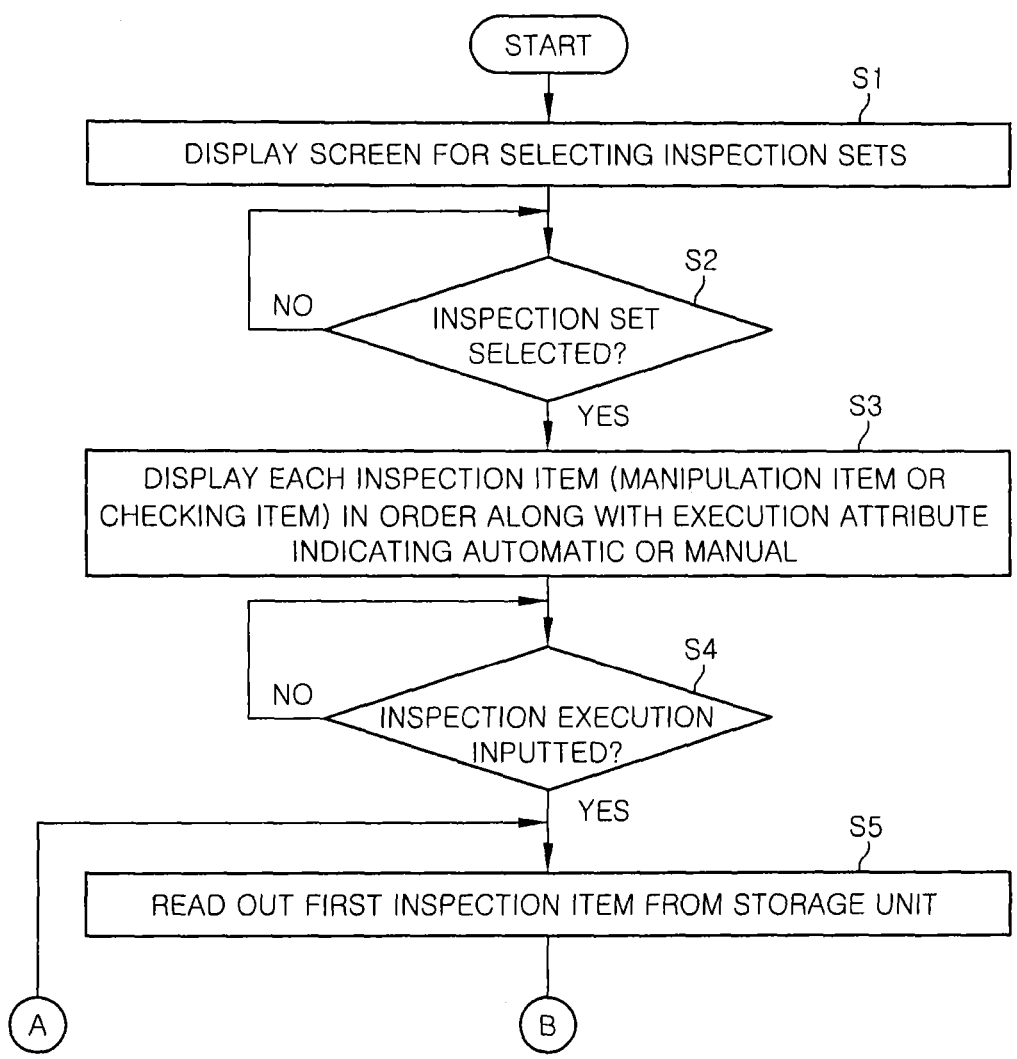
Figure 2C:
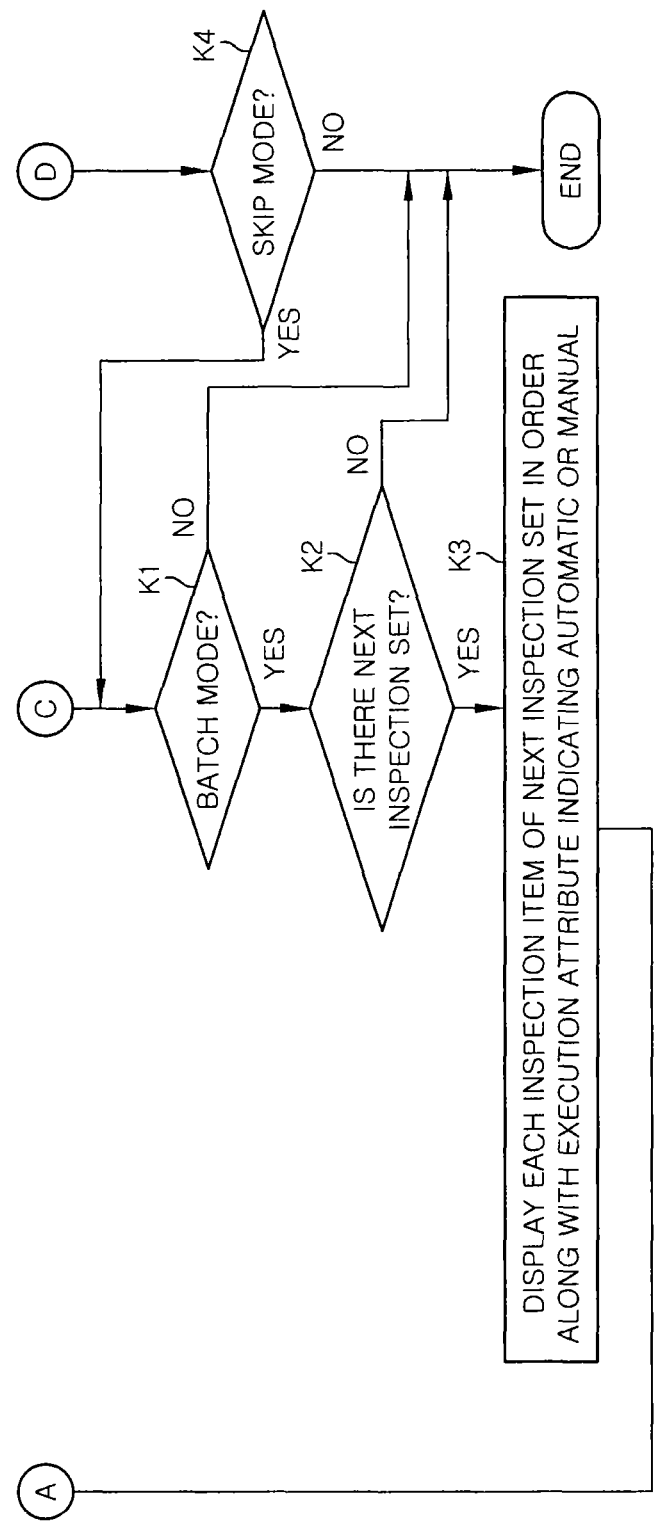
Figure 3:
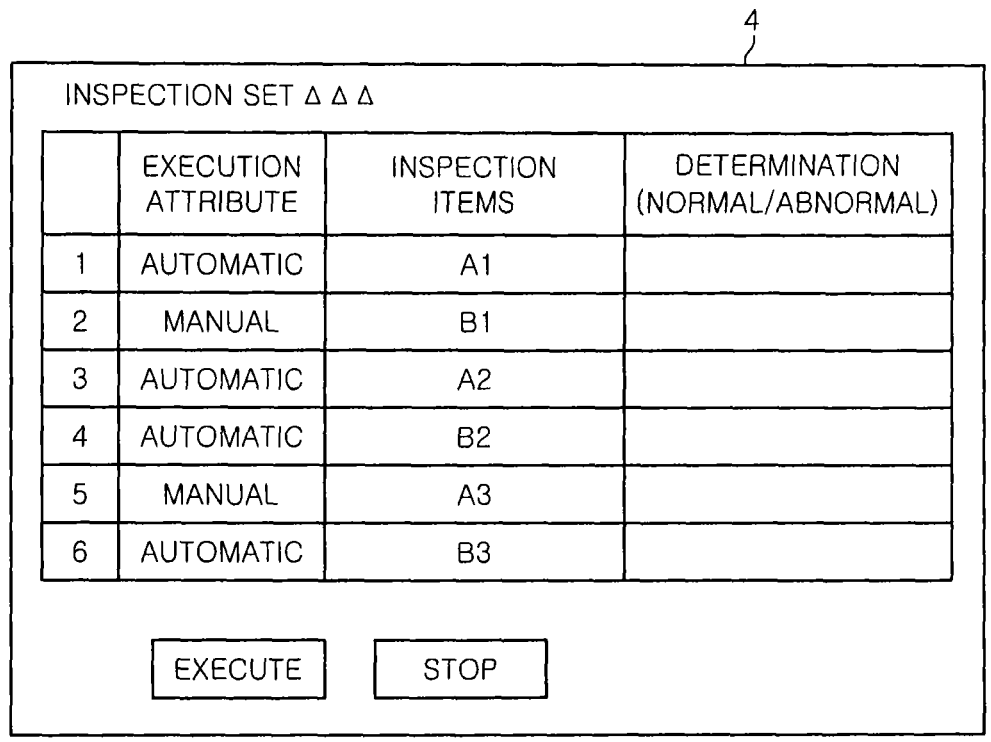
FIG. 3 is a schematic view showing an example screen displayed during the program execution.

Now, referring to FIGS. 2 to 5, the inspection program 1 will be elaborated. In FIGS. 3 and 5, an area surrounded by an outer frame represents a screen of the display 4. In FIGS. 2A to 2C, a flow of steps organized in the program 1 and a flow of execution results of the program 1 are depicted together.

Suppose that the program 1 is executed, a certain inspection category is selected from a screen showing a list of the inspection categories and a screen showing inspection sets (see, for example, FIG. 9) corresponding to the selected inspection category is displayed (step S1). If a user selects a certain inspection set from the screen (step S2), inspection items belonging to this inspection set are retrieved from the storage unit 2 and displayed on the screen while arranged in order as shown in FIG. 3 (step S3). In FIG. 3, the inspection items are abstractly displayed, wherein "A" represents a manipulation item and "B" represents a check item. Numerals added to the notations A and B indicate processing sequences.

Executing an inspection set implies performing the operations in such a manner of executing a certain manipulation (manipulation item), checking the result of the manipulation (check item), executing a next manipulation and checking the result of the next manipulation and so on in sequence.

For example, referring to FIG. 3, the inspection set is executed in such a manner that a manipulation item A1 is executed and, then, a check item B1 for the manipulation item A1 is executed and so on. Further, on the screen, an execution attribute for distinguishing automatic execution and manual execution is also displayed for each of the inspection items. For a manipulation item, the execution attribute indicates whether the manipulation item is automatically executed in response to a command from the control unit 100 or manually executed by the user. For a check item, the execution attribute indicates whether the control unit 100 automatically determines normality/abnormality based on a detection result from the detector 201 or whether the user determines normality/abnormality with sensitive facilities such as sight sense, auditory sense, olfactory sense and the like. That is, the data of the inspection items are stored in the storage unit 2 in such a way that the inspection items are correspondingly related with the execution attributes.

Further, in this example, as shown in FIG. 3, there is provided a column including cells on which determination results of inspection items are displayed. In this example, the manipulation items and the check items are displayed on different cells in a column of the inspection items.

Now, a process after the step S3 will be explained. In this example, a batch mode and a skip mode are provided as options. These modes can be selected from, for example, the screen for selecting the inspection sets in step S1. In this example, however, a case of performing the inspection in a typical basic mode without selecting these optional modes will be explained.

If the screen of FIG. 3 is displayed and the user presses a soft switch of "Execute" for executing an inspection start command, a first inspection item among the inspection items included in the selected inspection set is read out (steps S4 and S5). Subsequent steps are determined depending on whether the type of the inspection item is the manipulation item or the check item (step S50).

In this example, the first inspection item A1 is a manipulation item of which execution attribute is "automatic". Accordingly, based on this inspection item, a command for manipulating a manipulation target device in the semiconductor manufacturing apparatus 200 is outputted from the control unit 100. By way of example, in case where a controller is provided between the control unit 100 and the manipulation target device, the controller receives the command and outputs an operation signal to, e.g., an actuator of the manipulation target device. As a result, manipulation based on the manipulation item, such as opening a valve or turning off the power, is executed (steps S6 and S7).

In step S21, if this automatic manipulation is found to be "NG", i.e., if the manipulation could not be performed automatically, a message indicating abnormal termination is displayed on a cell in the determination result column corresponding to the inspection item A1 (step S13), and the execution of the inspection item (inspection) is terminated.

Figure 4A:
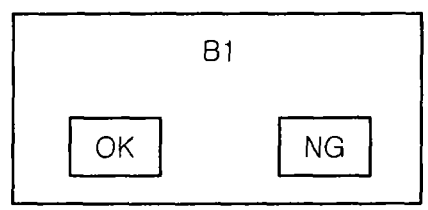
FIG. 4*a* is a schematic view showing an example screen displayed during the program execution.

On the other hand, if the result in step S21 is found to be "YES", that is, if the automatic manipulation is normally executed, a next inspection item is read out from the storage unit 2 (steps S8 and S9). Since the next inspection item B1 is a check item of which execution attribute is "manual", the process proceeds to step S11 from step S10, and a pop-up window is displayed on the screen of FIG. 3. FIG. 4a illustrates an example of the pop-up window. Here, the content of the check item B1 such as "an alarm has been ringing?" and a standby screen for inputting determination of the normality or abnormality of the checkup result (determination result) are displayed. In this example, soft switches of "OK" and "NG" are displayed.

Here, if it is determined by the user that the checkup result is abnormal (for example, if it is determined that the alarm has not been ringing for the check item of "an alarm has been ringing"), the soft switch of "NG" is pressed, and a message indicating abnormal termination is displayed on a cell in the determination result column corresponding to the inspection item B1 (steps S12 and S13), and the inspection of the inspection set is terminated. On the other hand, if the user determines that the checkup result is normal, a soft switch of "OK" is pressed, and a message indicating normal termination is displayed on the cell in the determination result column corresponding to the inspection item B1 (steps S14 and S15). Then, the process proceeds to steps S8 and S9, and a next inspection item A2 is read out. Further, in the workflow shown in FIGS. 2A to 2C, a dashed-line block indicates that the process involves an operation directly manipulated by the user without the intervention of the control unit 100 or an operation directly checked by the user with sensitive facilities.

After the next inspection item A2 is inspected as in the same manner as described above, a next inspection item B2 is read out. In this case, the execution attribute is "automatic" and, thus, the process proceeds to step S16 from step S10. Based on a detection result of the detector 201, the control unit 100 automatically determines whether the result of the checkup is normal or abnormal. For example, if the detection result is a gas flow rate, a determination is made by comparing the gas flow rate detected by the detector 201 with a threshold read out from the storage unit 2 (step S17). If it is determined by the control unit 100 that the result is abnormal, a message indicating abnormal termination is displayed on a cell in the determination result column corresponding to the inspection item B2 (step S13), and the inspection of the inspection item B2 is terminated. If the determination result is normal, on the other hand, a subsequent process is performed through step S15.

Figure 4B:
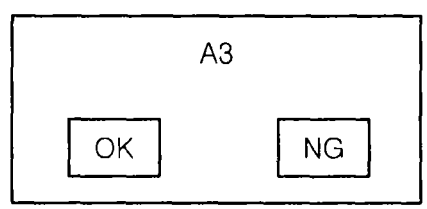
FIG. 4*b* is a schematic view showing an example screen displayed during the program execution.

If an inspection item A3 of which execution attribute is "manual" is read out, the process proceeds to step S18 and a pop-up window is displayed. FIG. 4b shows an example of the pop-up window. As for the style of statement of A3, in this example, a statement "Manipulation of ~ has been executed?" is displayed instead of a statement "Execute manipulation of ~". That is, it is required to surely confirm whether or not the manipulation is executed.

At this time, for example, in case where the manipulation item cannot be executed, a soft switch of "NG" is pressed, and, thus, the inspection of the inspection item can be terminated. In such a case, the result in step S22 is "YES", and a message indicating abnormal termination is displayed on a cell in the determination result column corresponding to the inspection item A3 (step S13). If the manipulation is normally terminated and an "OK" button on the pop-up window is pressed, the result in step S19 becomes "YES" and the process proceeds to step S15 where a message indicating normal termination is displayed on the cell in the determination result column corresponding to the inspection item A3.

In this way, if the inspection of the final inspection item (inspection item B3 in the example shown in FIG. 3) among the inspection items included in the selected inspection set is terminated, the result in step S8 becomes "YES", and the corresponding inspection operation is terminated.

Further, the aforementioned optional modes will be explained in further detail. Here, for the sake of convenience, a notation "K" is assigned to a step related to the optional mode. In case where a batch mode is selected, after the result of checking the final inspection item B3 is found to be normal, the result in step K1 becomes "YES" and, then, step K2 is executed. When there is a next inspection set, inspection items belonging to the next inspection set are retrieved from the storage unit 2 and displayed on the screen while arranged in order as stated above (step K3). Thereafter, as in the case of the aforementioned inspection item, the process proceeds to step S5 and an inspection operation is performed. In step K2, when there is no more next inspection set, the inspection operation is terminated. Here, the term "next inspection set" in step K2 refers to an inspection set that comes after the currently processed inspection set among the inspection sets belonging to the inspection category selected by the user.

Further, during the execution of the batch mode, if a skip mode is selected as the optional mode, after the determination result of a manipulation item or a check item is found to be abnormal and a message indicating abnormal termination is displayed in step S13, the inspection of the corresponding inspection set is terminated, and the process proceeds to step K1, step K2 and step K3 (step K4). That is, as described in the case of the batch mode, inspection items belonging to a next inspection set are displayed on the screen, and the process proceeds to step S5 and an inspection operation thereof is performed. The skip mode may be selected from a screen showing up after "Batch mode" is pressed or by pressing a soft switch of "Skip mode" provided together on the screen for selecting the "batch Mode". Further, validity or invalidity of the skip mode may be stored in the storage unit 2, and when executing the "batch mode," the stored information may be referred.

Here, the screen for arranging the inspection items in the order of workflow may not be limited to the example shown in FIG. 3. By way of example, as depicted in FIG. 5, a manipulation item and a check item corresponding to this manipulation item may be displayed on the same cell in the inspection item column. In this example, a manipulation item A4 and a check item B4 of which execution attributes are both "automatic" are displayed on the same cell in the inspection item column, and a manipulation item A6 and a check item B6 of which execution attributes are both "automatic" are displayed on the same cell in the inspection item column. As a check item for the manipulation item A6, besides B6, there is also a check item B'6 of which execution attribute is "manual". This check item B'6 is displayed on the next cell in the inspection item column.

In accordance with the above-described embodiment, for each inspection set, manipulation items and check items for inspection are displayed on the screen in the preset order, and it is also displayed whether these inspection items are supposed to be automatically or manually executed (see FIG. 3). If an inspection item is subjected to an automatic execution, the inspection item is automatically executed. On the other hand, if the inspection item is subjected to a manual execution, a pop-up window for inputting whether a manipulation item is executed or a pop-up window for inputting a checkup result is displayed. After inputting such information, a next inspection item is read out from the storage unit, and inspection operations are performed in order.

Accordingly, the screen serves as a navigator for inspection, and even when inspection items having two different attributes of automatic execution and manual execution are mixed, the inspection is performed in accurate order. Thus, an operation error can be prevented, and the inspection can be performed efficiently. Further, as compared to the conventional case of manipulating the screen based on the workflow chart written on the paper, time consumption can be greatly reduced.

In case of manual execution, it is desirable to display the pop-up window as described above in order to securely prevent an operation error. However, without being limited to the pop-up window, it may be also possible to use, for example, the screen of FIG. 3 by displaying a processed inspection item with a color different from that for an inspection item yet to be processed and displaying also soft switches (buttons) of "OK" and "NG" for each inspection item, thus using the screen of FIG. 3 as a standby screen for inputting a user's instruction.

Furthermore, as already mentioned above, by providing the batch mode and the skip mode, it is possible to cope with various inspection circumstances. The inspection operation discussed herein is an operation performed when maintenance of the apparatus is performed by the user or when the apparatus is tested by a manufacturer before the apparatus is shipped.

Now, a specific example of an inspection set will be explained. This inspection set is called "OUTPUT POWER ON" and is performed to inspect whether an abnormality detection for detecting a decrease in a supplied voltage is being executed for each device, e.g., a printed circuit board, of a semiconductor manufacturing apparatus including a vacuum transfer chamber and a multiple number of processing chambers hermetically connected to the vacuum transfer chamber, wherein the printed circuit board has thereon a circuit to operate an actuator of a valve provided in each processing chamber. This abnormality detection may be performed by setting a source voltage supplied to the printed circuit board to be zero.

Figure 6:
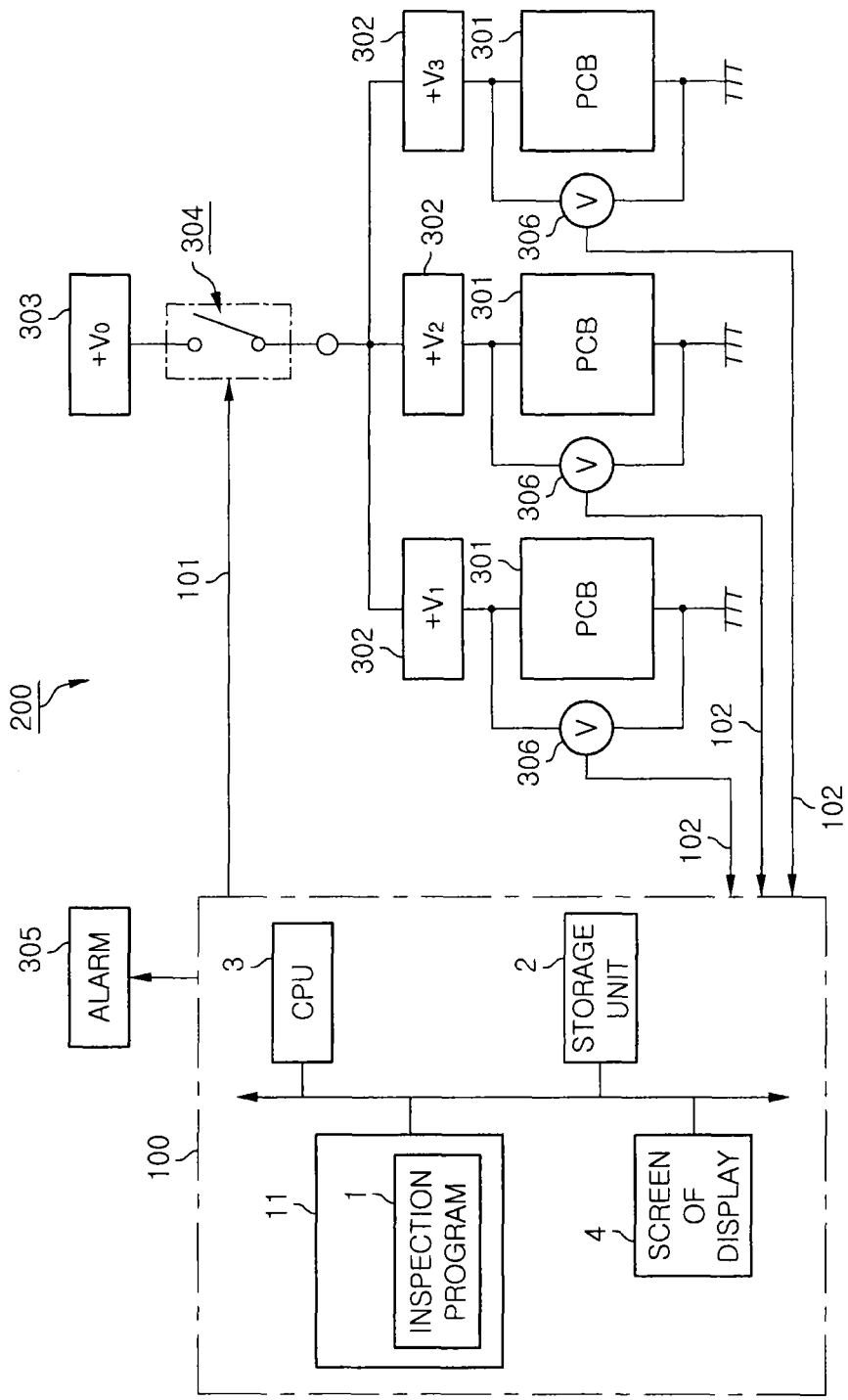
FIG. 6 is a configuration view schematically illustrating an example inspection target of an inspection set.

FIG. 6 is a schematic configuration view of inspection targets of the inspection set of the present example. A reference numeral '301' denotes a printed circuit board (PCB), and three printed circuit boards 301 are shown in this example. A reference numeral '303' denotes a DC power supply unit, and a voltage from this DC power supply unit 303 is supplied to voltage adjustors 302 each of which adjusts the voltage to be set at a certain voltage, and the adjusted voltages are supplied to the printed circuit boards 301, respectively. A reference numeral '304' represents a switch for starting or stopping the supply of the DC voltage. A reference numeral '305' is an alarm generator and is configured to ring an alarm in response to, for example, a control signal transmitted from the control unit 100 through the signal line 101. In FIG. 6, a reference numeral '306' denotes a voltage detector for detecting a decrease in a voltage applied to each printed circuit board 301, and a detection result indicating the decrease in the voltage is sent from the voltage detector 306 to the control unit 100 through a signal line 102. In response to the detection result indicating the decrease in the voltage, the control unit 100 transmits a control signal to the alarm generator 305 through the signal line 101 to allow the alarm generator 305 to ring an alarm.

FIGS. 7 to 16 illustrate a part of screens displayed after the inspection program (software) is executed. In these figures, the inside of a frame indicated by a reference numeral '4' shows the content displayed on the screen. In this example, the screen is manipulated by pressing soft switches (buttons) displayed on a touch screen. Alternatively, a mouse may be used to manipulate the screen by clicking the switches thereof.

Figure 7:
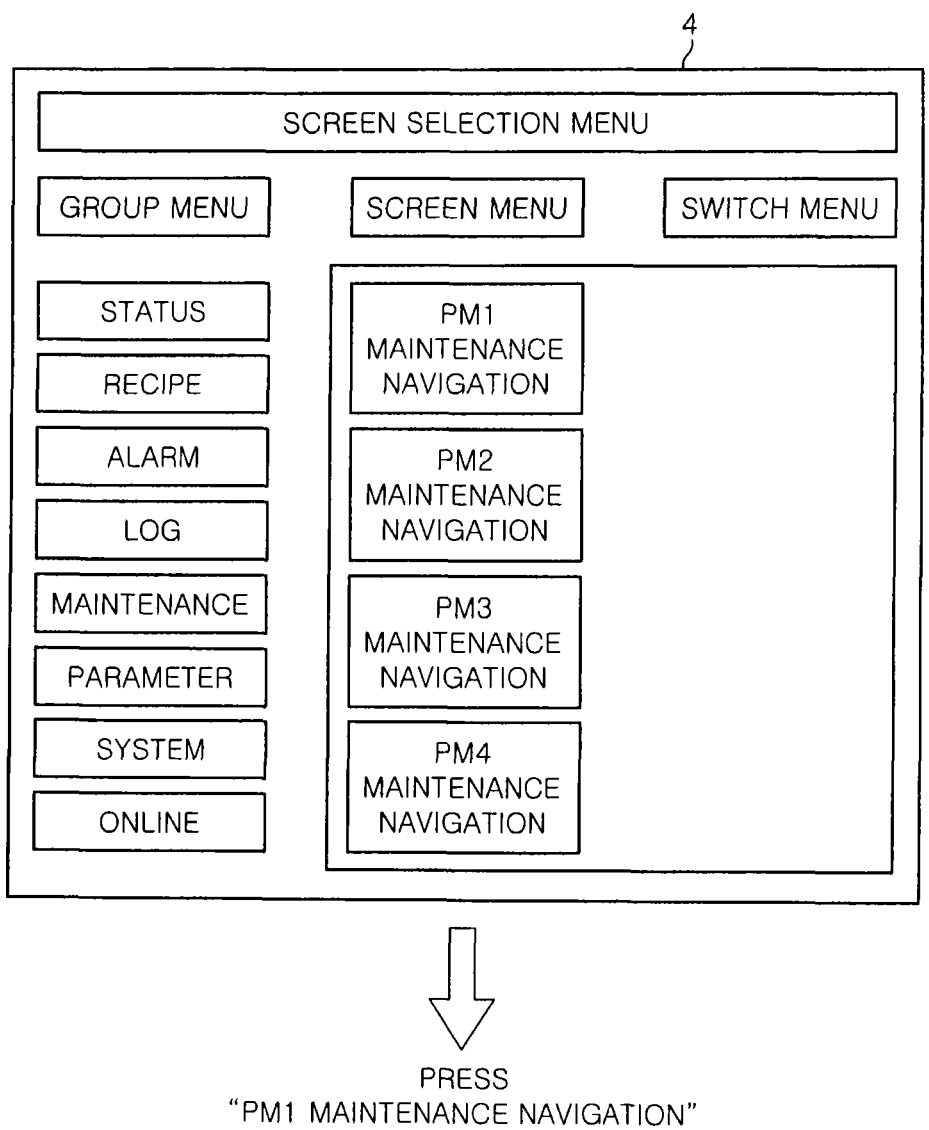
FIG. 7 is a schematic view showing an example screen displayed during the program execution.
Figure 8:
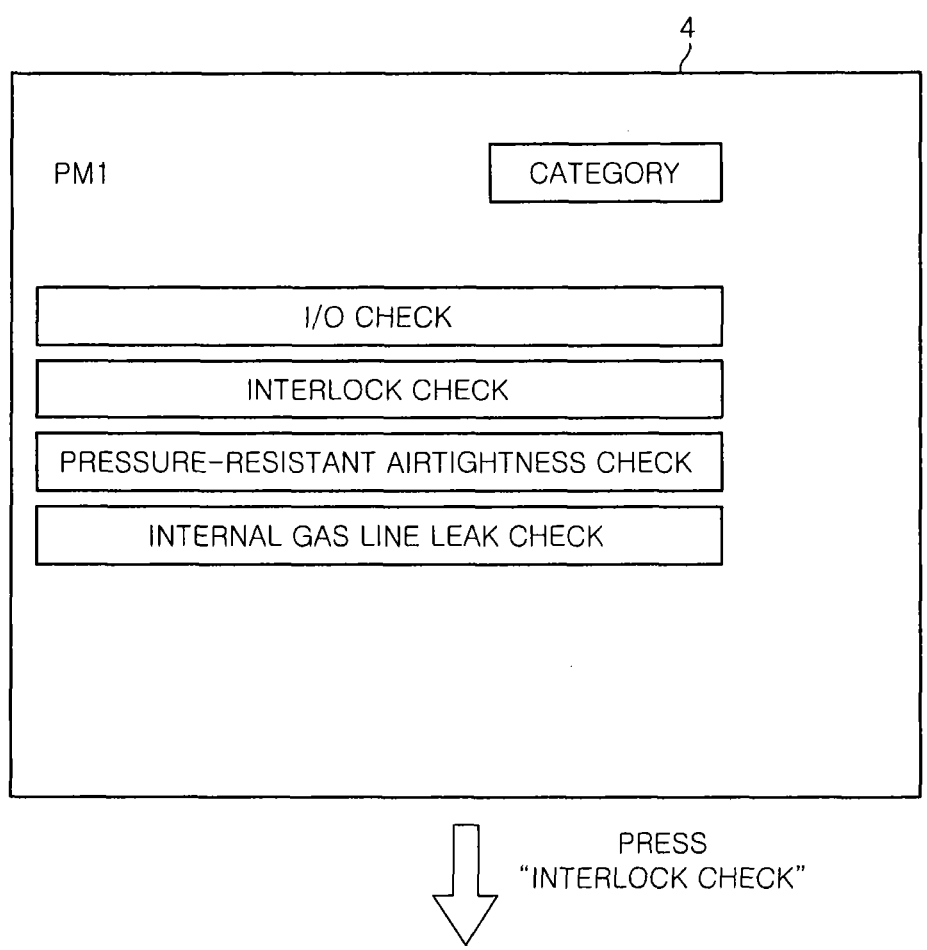
FIG. 8 is a schematic view showing an example screen displayed during the program execution.

Before the inspection set "OUTPUT POWER ON" is executed, a "Maintenance" switch on the left side of FIG. 7 is pressed (selected) and a "PM1 Maintenance Navigation" switch on the right is pressed (selected), so that a screen shown in FIG. 8 is displayed. Then, if an "Interlock Check" is pressed on this screen, a screen for selecting inspection sets belonging to the category of "Interlock Check" is displayed, as shown in FIG. 9. On this screen, suppose that an inspection set No. 1 is selected and a switch of "Detail" is pressed. That is, in this example, the screens illustrated in FIGS. 7 to 9 correspond to screens for selecting inspection sets. Here, "PM1" represents one of the aforementioned processing chambers.

Further, on the screen of FIG. 7, by pressing "Log," a history or results of inspection operations executed in the past may be displayed. Further, in FIGS. 9 and 10, by scrolling the screen downward, inspection sets or inspection items (inspection contents) following those displayed on the screen can be displayed. Furthermore, on the screen of FIG. 9, if the switch "Detail" is pressed without selecting the inspection set numbers individually, a detailed screen of the inspection item No. 1 is displayed.

Now, the sequence for executing the inspection sets will be explained with reference to FIGS. 2A to 2C. If it is assumed that the inspection set "OUTPUT POWER ON" is selected by pressing the "Detail" button on the screen of FIG. 9, the process has proceeded to step S2 from step S1 and the result in step S2 is "YES." Then, the content of the inspection set is retrieved from the storage unit 2. That is, as shown in FIG. 10, manipulation items and check items for the inspection are displayed on the screen of the display 4 while arranged in order with execution attributes assigned thereto (step S3).

Numerals on the left side of FIG. 10 are numbers indicating the processing order of the manipulation items and the check items. The execution attributes are expressed by being specified on the left sides of the cells of respective inspection items in this example. However, it may be also possible to use other methods. For example, the execution attributes may be displayed by using a different color in letters of each of the inspection items. Furthermore, as already stated above, the manipulation items and the check items (inspection contents) in the cells to which numerals are assigned all correspond to the inspection items. In this example, six inspection items are displayed while arranged in order.

Figure 11:
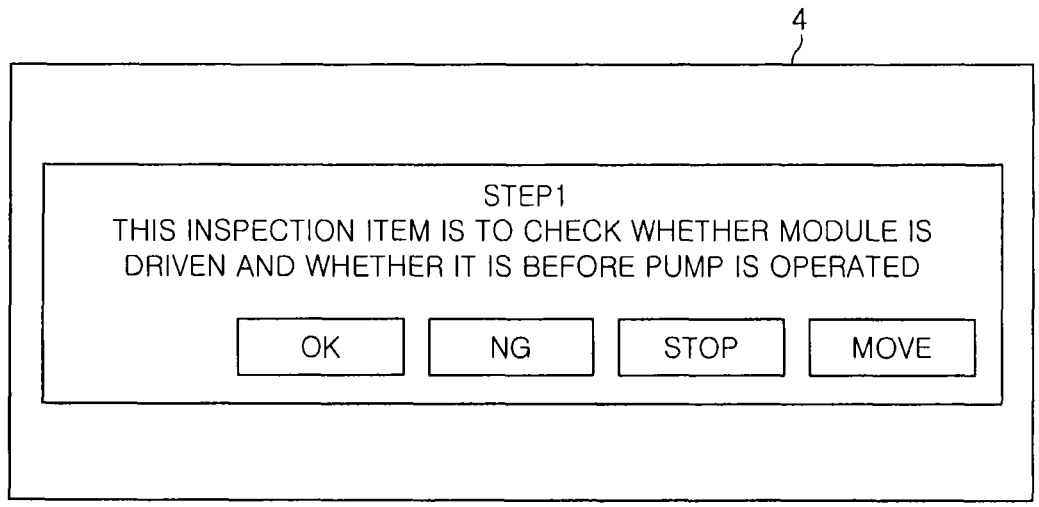
FIG. 11 is a schematic view showing an example screen displayed during the program execution.
Figure 12:
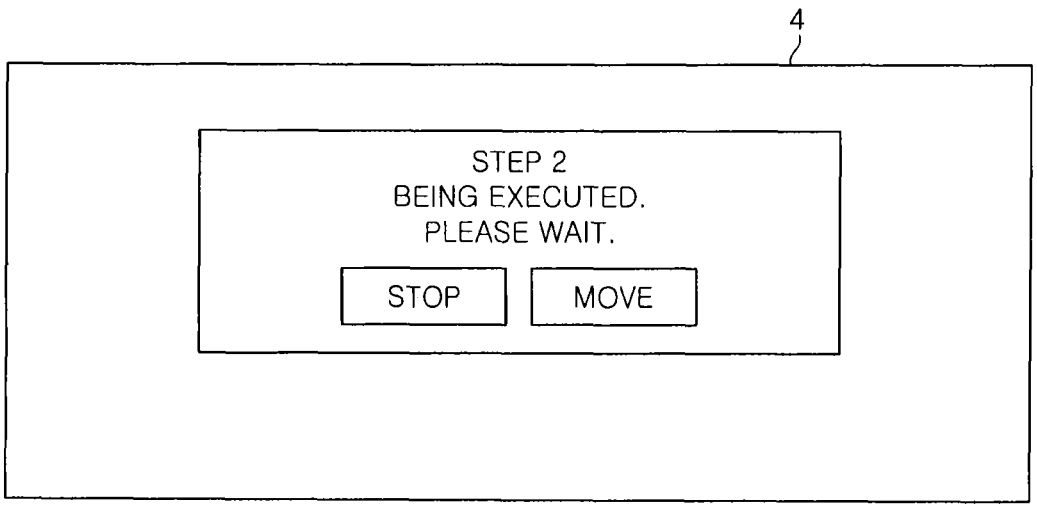
FIG. 12 is a schematic view showing an example screen displayed during the program execution.

Then, if a soft switch "Execute" is pressed on the screen of FIG. 10, the result in step S4 becomes "Yes," and a first inspection item is read out from the storage unit 2 (step S5). The first inspection item is "This inspection item is to check whether a module is driven and whether it is before a pump is operated". Since the execution attribute of this inspection item is "manual" (including a check item to be checked by the user), the result in step S10 becomes "No", and a pop-up window for the corresponding check item is displayed, as shown in FIG. 11 (step S11). If the user confirms that the module (processing chamber) is driven and it is before the pump is operated, so that an "OK" button is pressed, results in steps S12 and S14 become "No" and "Yes", respectively, and a message of "Normal" indicating normal termination is displayed on a cell in the "Determination" column on the right side of the corresponding inspection item in FIG. 10.

In FIG. 10, the "Detection value" column on the right side of the inspection item column is where a detection value is displayed when a check item is automatically executed. The detection value is not displayed in this example.

Further, when an inspection item is a check item including manual manipulation item, steps S6, S18, S19, S15, S8 and S9 may be executed before executing step S10. However, for the simplicity of explanation, elaboration of these steps will be omitted here and in the following description.

Further, as for the pop-up window of FIG. 11, if a "NG" button is pressed, the result in step S12 (or step S22) becomes "YES," and a message of "Abnormal" indicating abnormal termination is displayed on a cell in the "Determination" column on the right side of the corresponding inspection item in FIG. 10 (step S13). Further, although not shown in FIGS. 2A to 2C, if a "Stop" switch is pressed, inspection of this inspection set is stopped and a message of "Stop" is displayed on the corresponding cell in the "Determination" column and the screen of FIG. 10 is displayed again.

As can be seen from FIG. 10, since there exists a next inspection item after the first inspection item, the result in step S8 becomes "No" and, then, step S9 is executed and a second inspection item is read out. This second inspection item is "Setting 0 to OUTPUT POWER ON" which is an automatic manipulation item. Thus, the result in step S6 becomes "Yes", and this manipulation item is automatically executed (step S7).

To elaborate, in response to a control signal transmitted from the control unit 100 through the signal line 101, the switch 304 is turned off, and a voltage supplied to the printed circuit board 301 is set to be zero. Further, while executing this manipulation item, a pop-up window having a content of "Being executed. Please wait" is displayed. A decrease in the voltage supplied to the printed circuit board 301 is detected by the voltage detector 306 and the detection result is sent to the control unit 100. In case where this manipulation item could not be terminated normally, the result in step S21 becomes "No", and a message of "Abnormal" indicating abnormal termination is displayed on a cell in the "Determination" column on the right side of the corresponding inspection item in FIG. 10 (step S13). Further, on the pop-up window of FIG. 12, a "Stop" button for stopping the inspection in the same manner as described above is also displayed.

Here, in case of a manual manipulation item, the process proceeds to step S18 from step S6 and, then, step S19 is executed. In this embodiment, however, it is assumed that "NO" is not selected in step S6, and description thereof will be omitted.

Figure 13:
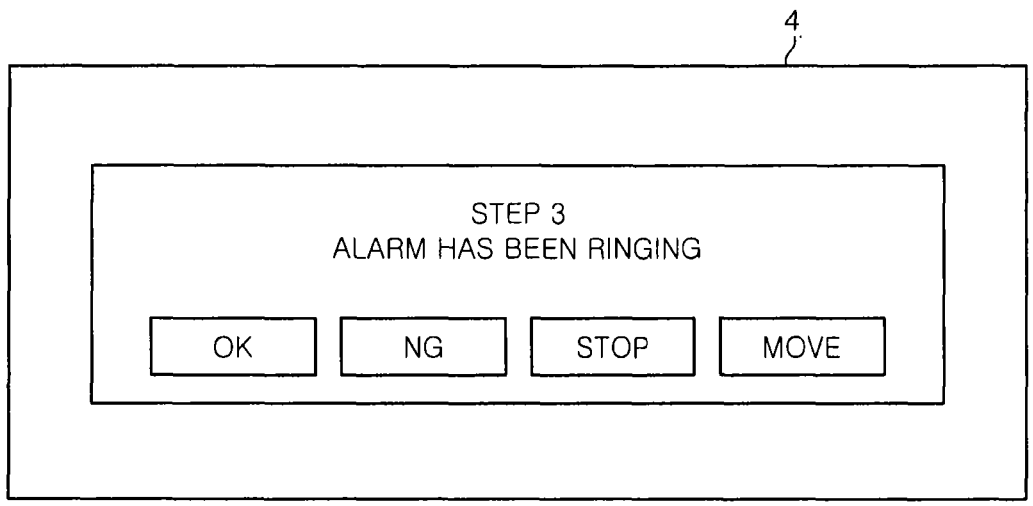
FIG. 13 is a schematic view showing an example screen displayed during the program execution.

After the above-stated automatic manipulation item is normally terminated and the result in step S21 becomes "YES," there still remains an inspection item after the second inspection item. Thus, the result in step S8 becomes "No," and a third inspection item asking "an alarm has been ringing" is read out in step S9. This inspection item is a manual check item, like the first inspection item. Thus, the result in step S10 becomes "No", and a pop-up window shown in FIG. 13 is displayed. The user checks whether an alarm has been ringing by the alarm generator 305, and if an "OK" button is pressed from the pop-up window, the results in steps S12 and S14 become "NO" and "YES," respectively, and a message of "Normal" indicating normal termination of the inspection item is displayed on a cell in the "Determination" column on the right side of the corresponding inspection item in FIG. 10 (step S15).

Figure 14:
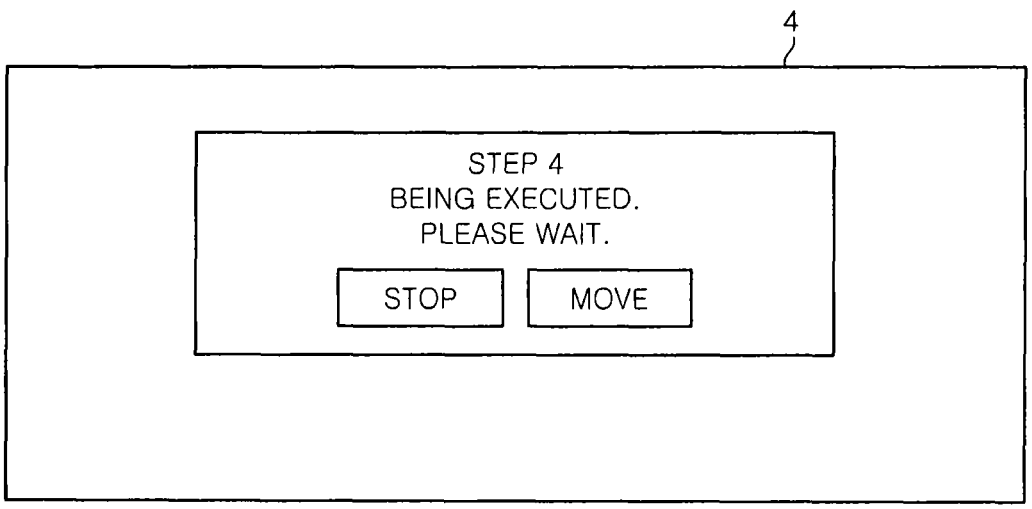
FIG. 14 is a schematic view showing an example screen displayed during the program execution.
Figure 15:
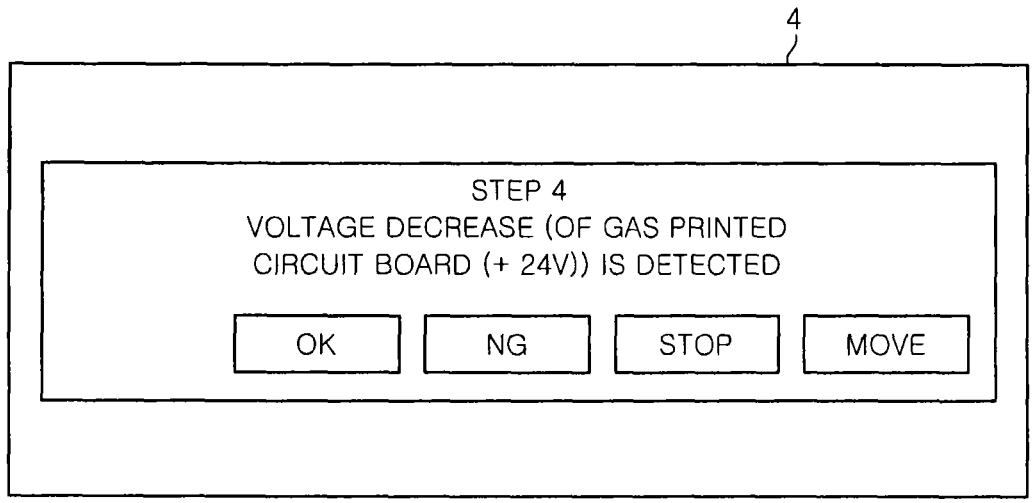
FIG. 15 is a schematic view showing an example screen displayed during the program execution.

Since there still remains a next inspection item after the third inspection item, the result in step S8 becomes "NO", and a fourth inspection item is read out (step S9). This inspection item asking "the message saying "A voltage decrease (of a GAS printed circuit board (+24V)) is detected" is displayed" is an automatic check item, the result in step S10 becomes "YES", and a pop-up window shown in FIG. 14 is displayed and the checkup operation is automatically performed (step S16). That is, at a part where a voltage of about 24 V is typically supplied, e.g., the printed circuit board 301 on the left side of FIG. 6, a voltage decrease occurs by turning off the switch 304. The detection of this voltage decrease is sent to the control unit 100 through the signal line 102 from the voltage detector 306. Through this inspection process, the voltage decrease is automatically detected by the control unit 100. When this inspection process is completed, a pop-up window including a message saying "The voltage decrease of a GAS printed circuit board is detected" is displayed on the screen. Since this check item is automatically processed, the pop-up window of FIG. 15 is automatically turned off and a message indicating normal termination is displayed on the cell in the determination result column corresponding to this check item (step S15) if the result is normal. Then, the process proceeds to the subsequent step.

As depicted in FIG. 10, since there exists a fifth inspection item, the result in step S8 becomes "NO". Here, the fifth inspection item asking "the message saying "A voltage decrease (of GAS printed circuit board (+5V)) is detected" is displayed" is an automatic check item, the process proceeds to steps S9, S10 and S16 as in the case of the fourth inspection item, and the checkup operation is automatically performed. That is, at a part where a voltage of about 5V is typically supplied, e.g., the printed circuit board 301 on the middle of FIG. 6, occurrence of a voltage decrease as a result of turning off the switch 304 is automatically detected. If this result is normal (step S17), the process proceeds from step S15 to step S8. In this case, the pop-up window is displayed and then disappears automatically, as in the same manner as described in FIG. 15.

After the fifth inspection item, there still exists a sixth inspection item asking "the message saying "A voltage decrease (of GAS printed circuit board (+15V)) is detected" is displayed". This sixth inspection item is also an automatic check item, like the fourth and fifth inspection items. Accordingly, the checkup operation is automatically performed in step S16 through steps S8, S9 and S10. That is, at a part where a voltage of about 15V is typically supplied, e.g., the printed circuit board 301 on the right side of FIG. 6, occurrence of a voltage decrease as a result of turning off the switch 304 is automatically detected. Thereafter, the process proceeds to step S8 through steps S17 and S15. If the sixth inspection item is terminated, the result in step S8 becomes "YES". In this example, since a batch mode is not set, the result in step K1 is "NO" and the inspection of the inspection set of "OUTPUT POWER ON" is terminated. Then, a message of "Normal" is displayed on a cell in the "Determination" column on the right side of the first inspection item "OUTPUT POWER ON" of FIG. 9.

Figure 16:
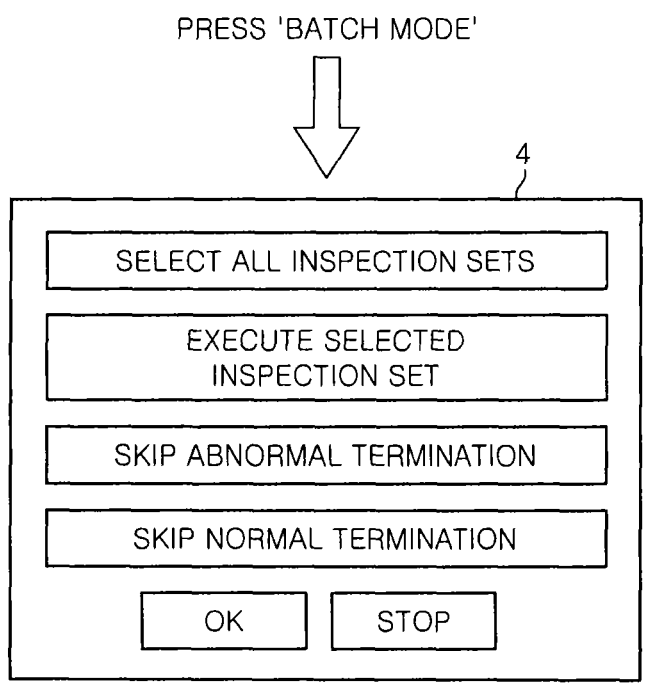
FIG. 16 is a schematic view showing an example screen displayed during the program execution.

Here, a batch mode will be elaborated. If a switch "Batch Execution," not the switch "Detail," is pressed on the screen of FIG. 9, a screen of FIG. 16 is displayed. Then, if "Select all inspection sets" is selected and an "OK" button is pressed, a second inspection set "External Interlock Level 1 (Customer Signal Access)" is executed in continuation of the above-described first inspection set "OUTPUT POWER ON" under the inspection category of "Interlock Check". Thereafter, the third and the subsequent inspection sets belonging to the inspection category "Interlock Check" are sequentially executed. That is, if the "OK" button is pressed, the result in step K1 becomes "YES" and it is determined whether there exists a next inspection set (step K2). If the result in step K2 is "YES", manipulation items and check items for the inspection of the second inspection set "External Interlock Level 1 (Customer Signal Access)" are displayed on the display 4 while arranged in sequence with execution attributes assigned thereto (Step K3). Then, an inspection process from the above-described step S5 is performed. Afterward, upon the completion of the inspection of all the inspection sets included in the inspection category of "Interlock Check," the result in step K2 becomes "NO" and the inspection is terminated.

In this batch mode, in case where the number of a certain inspection set, e.g., "No. 6" is selected on the screen of FIG. 9 and, subsequently, "Execute Selected Inspection set" is selected and an "OK" button is pressed on the screen of FIG. 16, inspection of the sixth to the last inspection sets is started.

Now, a skip mode will be explained. On the screen of FIG. 16, if "Skip Abnormal Termination" is selected and the "OK" button is pressed, the result in step K4 is "YES" in case where a message indicating abnormal termination is displayed for a certain inspection item in the above-described step S13 and the result in step K1 becomes "YES". If there remains a next inspection set, the result in step K2 becomes "YES", so that the inspection set including such abnormal inspection item is skipped and inspection of the next inspection set is performed.

Further, in the skip mode, during inspecting a multiple number of inspection sets in order, by selecting "Skip Normal Termination" and pressing the "OK" button, if an inspection set of which inspection has been already normally terminated is found, such inspection set is skipped, and inspection of a next inspection set is performed.

Here, soft switches provided on the screen of FIG. 9 will be explained. "CSV Preserve" is a switch for storing the content of an inspection set and an inspection result including inspection termination time or determination in the form that is readable by other software. "Determination Clear" is a switch for clearing the obtained inspection result and may be used to restart the inspection from the beginning after, for example, remodeling or renovating the apparatus.

Figure 17:
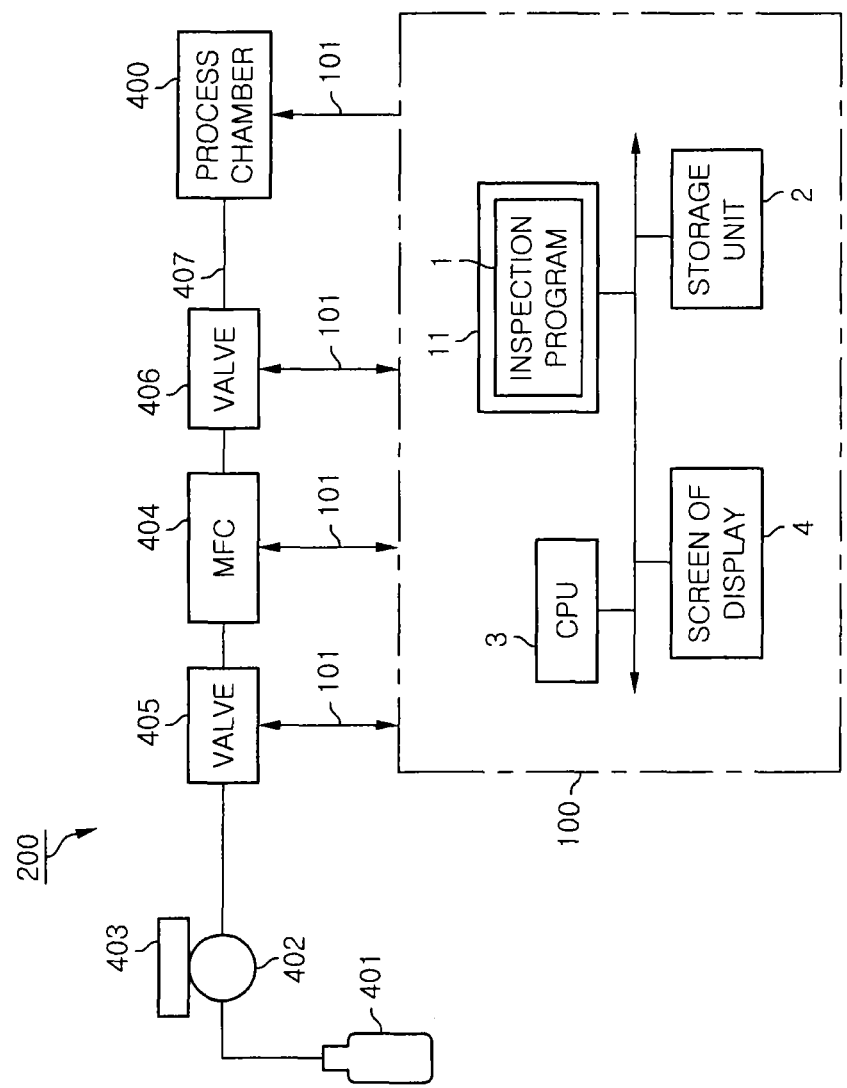
FIG. 17 is a configuration view schematically illustrating an example inspection target of an inspection set.

Now, another specific example of an inspection set will be explained. This inspection set is "Gas Line Valve Operation" for inspecting, referring to FIG. 17, whether a flow rate of a gas flowing in a gas line connected at one end to a processing chamber, an opening degree of a regulator of a gas cylinder connected to the other end of the gas line and an opening/closing operation of a valve provided in a gas line correspond to one another accurately. In FIG. 17, reference numerals '400', '401', '402', '403' and '404' represent a processing chamber, a gas cylinder, a regulator, a pressure gauge and a mass flow controller (MFC) serving as a detector as well as a controller, respectively. Further, reference numerals '405' and '406' are valves and a reference numeral '407' is a gas line.

Figure 18:
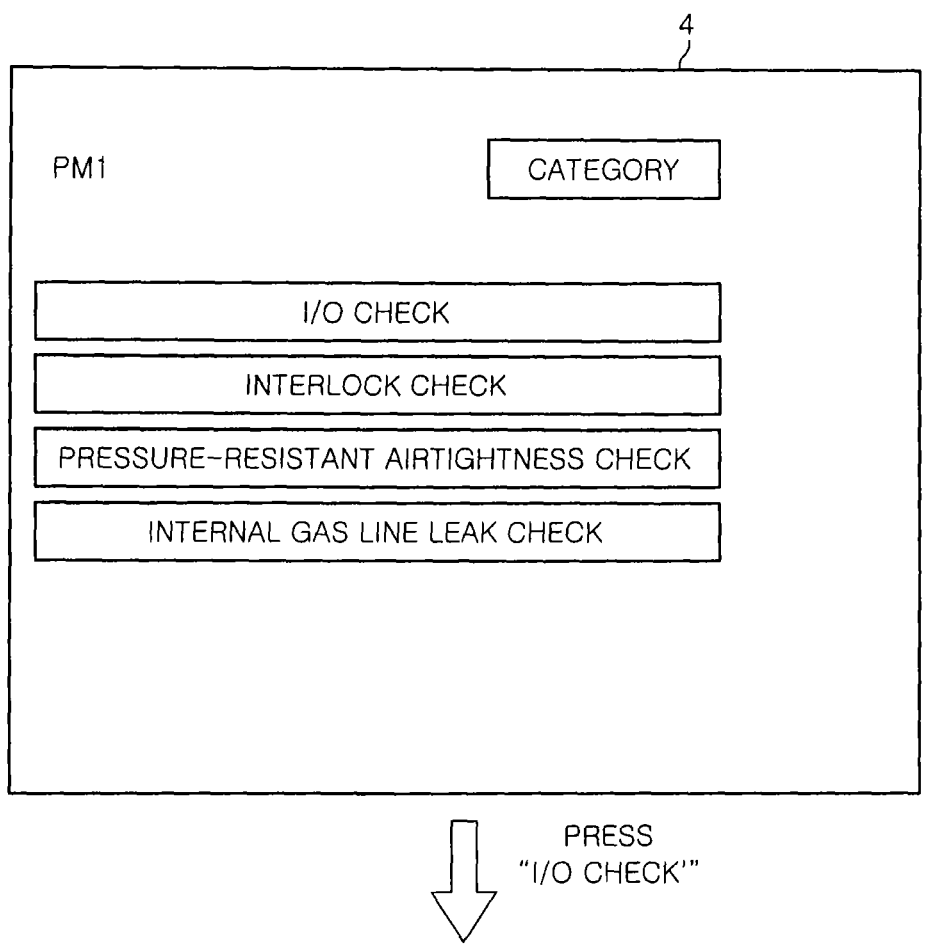
FIG. 18 is a schematic view showing an example screen displayed during the program execution.

Screens displayed for this inspection set and inspection items belonging to this inspection set will be discussed. First, as shown in FIG. 18, if a switch of "I/O Check" is pressed to select an inspection category as in the screen of FIG. 8, a list of inspection sets included in this category of "I/O Check" are displayed as shown in FIG. 19 (step S1). In this example, among the inspection sets, an inspection set of "No. 41-2" named "Valve Operation of Gas Line 4 (Option) (Including Regulator)" is executed. Thus, FIG. 19 shows a state in which a part of the screen is scrolled downward. Further, a "Gas Line 4" is one of gas lines provided in the processing chamber 400. Here, it is the gas line 407.

Figure 21:
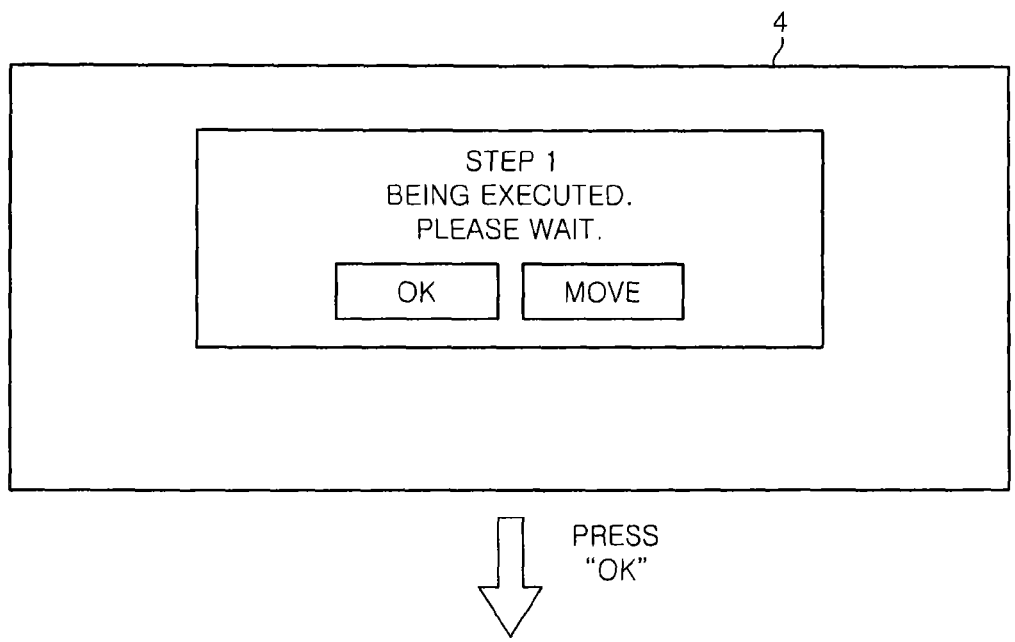
FIG. 21 is a schematic view showing an example screen displayed during the program execution.

On the screen of FIG. 19, if the inspection set of "No. 41-2" is selected and a "Detail" button is pressed, the result in step S2 becomes "YES", and inspection items included in this inspection set are displayed as illustrated in FIG. 20. On this screen, as stated above, manipulation items and check items for inspection are arranged in order with their execution attributes assigned thereto (step S3). On the screen of FIG. 20, if a switch of "Execute" is pressed, the result in step S4 becomes "YES", and the first inspection item is read out from the storage unit 2 (step S5). The first inspection item is an automatic manipulation item having a content of "Supply a gas at a maximum flow rate into gas line 4 for 10 seconds." Accordingly, the result in step S6 is "YES" and a pop-up window having a content of "Being Executed. Please Wait" is displayed, as shown in FIG. 21. In step S7, this manipulation item is automatically executed.

To elaborate, control signals are sent from the control unit 100 to the valves 405 and 406 to open both of the valves 405 and 406, to thereby supply a gas at a maximum flow rate to the mass flow controller 404. At this time, if the automatic manipulation is not normally executed, the result in step S21 becomes "NO" and step S13 is executed and a message of "Abnormal" is displayed on a cell in the "Determination" column corresponding to this manipulation item.

Referring to FIG. 21, if an "OK" switch is pressed or if this pop-up window is automatically disappeared, the result in step S21 is "YES". Since there exists a next inspection item, the result in step S8 is "NO" and the second inspection item is read out in step S9. In this example, there are 10 inspection items. Thus, the result in step S8 becomes "NO" for the first to ninth inspection items. Here, detailed description thereof will be omitted.

The second inspection item is an automatic check item having a content of "Check whether a gas has flown into gas Line 4 at a set flow rate." Accordingly, the result in step S10 is "YES". At this time, a gas flow rate detected by the mass flow controller 404 is sent to the control unit 100 through the signal line 101, and the control unit 100 determines whether this detection value coincides with a set flow rate (maximum flow rate) (step S16). If this detection value is found to coincide with the set flow rate, the result in step S17 is "YES", and a message of "Normal" indicating normal termination is displayed on a cell in the "Determination" column of FIG. 20 (step S15). Further, the detected gas flow rate is also displayed on a cell in the "Detection Value" column on the right side of the corresponding inspection item. On the other hand, if the detection value from the mass flow controller 404 is found not to coincide with the set flow rate, the result in step S17 is "NO" and a message of "Abnormal" indicating abnormal termination is written on the cell in the "Determination" column of FIG. 20 corresponding to the inspection item (step S13).

Subsequently, in step S9, the third inspection item, which is an automatic manipulation item having a content of "Maintain State of STEP No. 1", is read out and the result in step S6 becomes "YES". In step S7, the gas flow rate (the states of the valves 405 and 406 and the set flow rate of the mass flow controller 404) is maintained. Then, the process proceeds to step S9 through step S21, and the fourth inspection item is read out.

Figure 22:
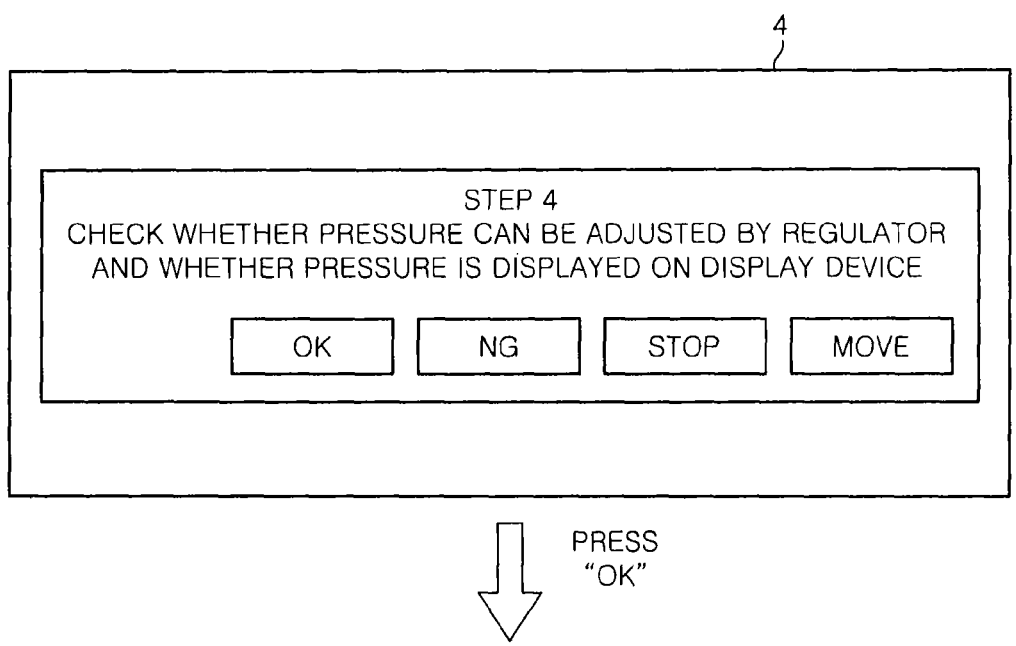
FIG. 22 is a schematic view showing an example screen displayed during the program execution.

The fourth inspection time is "Check whether a pressure can be adjusted by the regulator and whether the pressure is displayed on the display device." Since this inspection item is a check item including a manual manipulation item, the result in step S10 is "NO" and a pop-up window as shown in FIG. 22 is displayed (step S11). Then, an operator observes, with their naked eyes, a pressure display in the display device (pressure gauge 403) to check whether the pressure can be adjusted by rotating the regulator 402. If it is found out that the pressure can be adjusted, an "OK" button is pressed on a screen of FIG. 22, and results in steps S12 and S14 become "NO" and "YES", respectively. Further, a message of "Normal" indicating normal termination is displayed on a cell in the "Determination" column of FIG. 20 (step S15).

On the other hand, if it is found out that the pressure cannot be adjusted, a message of "Abnormal" indicating abnormal termination is displayed on a cell in the "Determination" column of FIG. 20 (step S13).

Then, the fifth inspection item having a content of "Close the regulator and check whether the pressure on display device becomes a minus value" is read out in step S9. This inspection item is a check item including a manual manipulation item, like the fourth inspection item. Here, redundant description of respective steps in FIGS. 2A to 2C will be omitted. Redundant description of steps in FIGS. 2A to 2C for the sixth and seventh inspection items to be described later will also be omitted.

Figure 23:
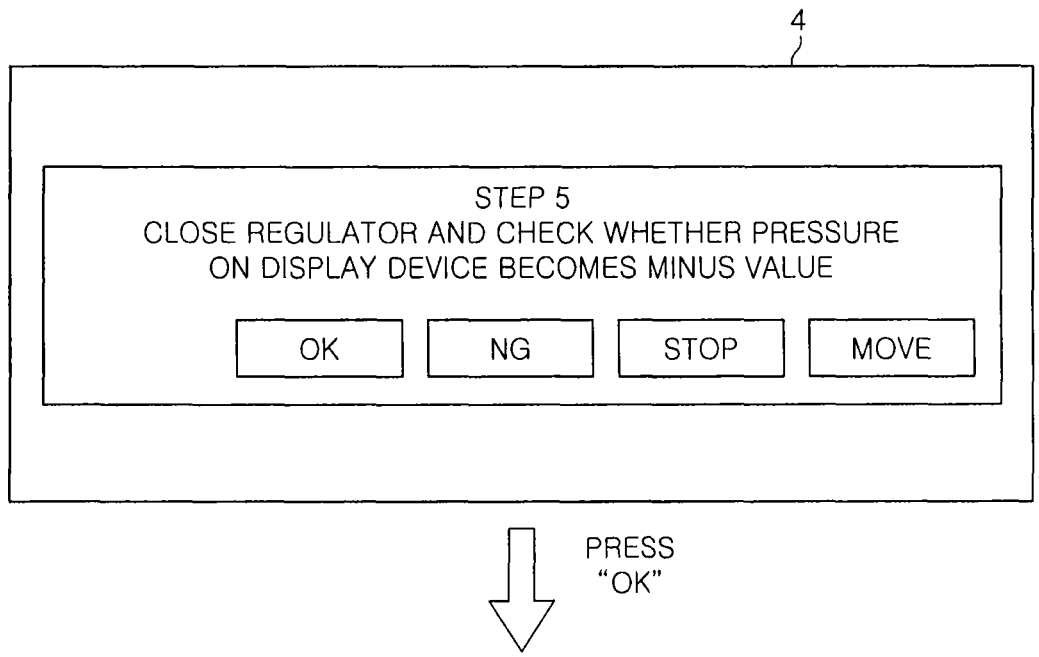
FIG. 23 is a schematic view showing an example screen displayed during the program execution.
Figure 24:
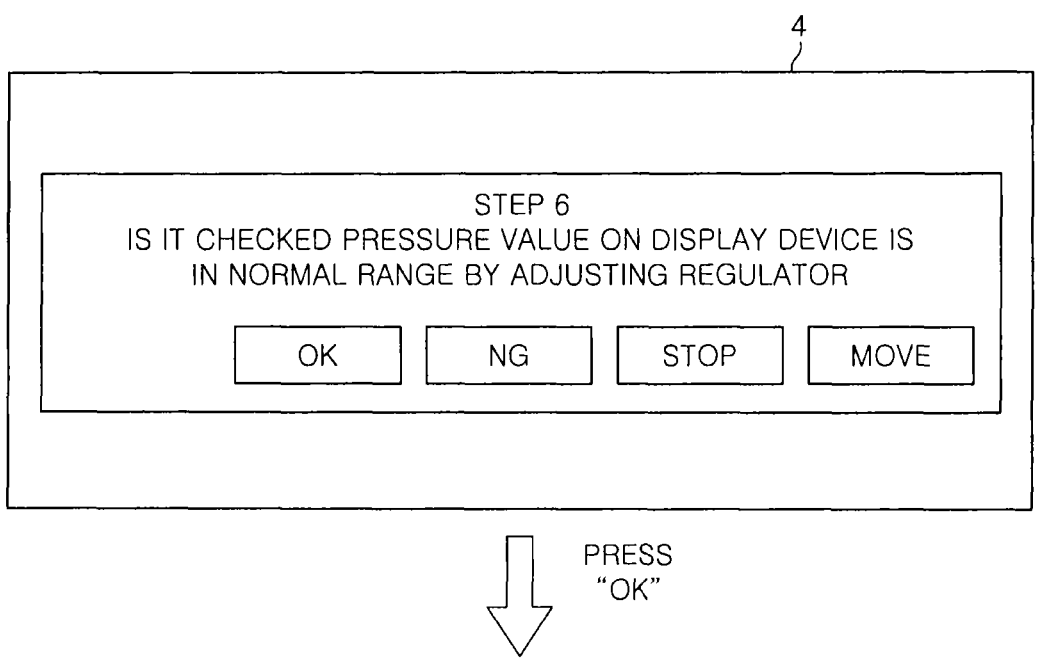
FIG. 24 is a schematic view showing an example screen displayed during the program execution.
Figure 25:
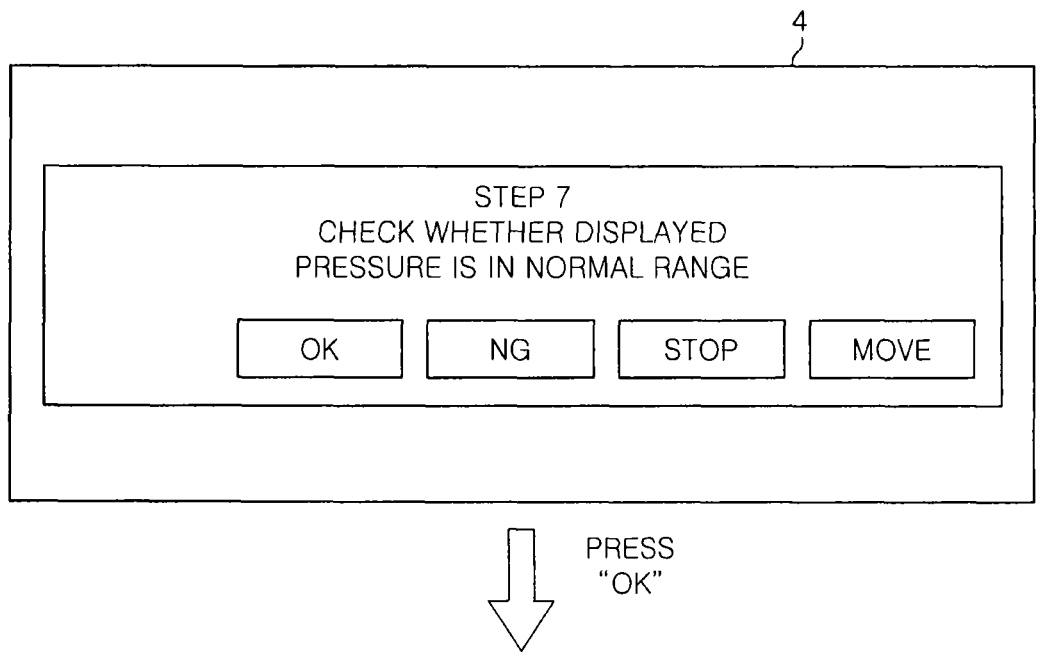
FIG. 25 is a schematic view showing an example screen displayed during the program execution.

For the fifth inspection item, a pop-up window of FIG. 23 is displayed. Then, the operator closes the regulator 402 and reads the pressure gauge 403 to check whether the pressure value becomes minus or not. If the inspection by the operator is normally terminated and an "OK" button is pressed, a pop-up window including the sixth inspection item having a content of "Is it checked the pressure value on the display device is in a normal range by adjusting the regulator?" is displayed as shown in FIG. 24. The operator adjusts the opening degree of the regulator 402 and reads the pressure value on the pressure gauge 403. If the pressure value on the pressure gauge 403 is found to be in the normal range, an "OK" button is pressed, and, as depicted in FIG. 25, a pop-up window showing the seventh inspection item having a content of "Check whether the displayed pressure is in the normal range" is displayed. The operator checks whether the displayed pressure value of the pressure gauge 403 is in the normal range, and if so, the operator presses the "OK" button.

Now, eighth inspection items and inspection items after that will be explained, referring back to FIGS. 2A to 2C. First, in step S9, the eighth inspection item having a content of "Supply a purge gas at a maximum flow rate into the gas line 4 for 10 seconds" is read out. Since this inspection item is an automatic manipulation item, the result in step S6 becomes "YES" and a message of FIG. 26 is displayed on the screen and the corresponding manipulation is automatically performed (step S7).

To elaborate, the valves 405 and 406 are both opened to achieve the maximum flow rate at the opening degree of the regulator 402 adjusted in the seventh inspection item by the operator, and the maximum flow rate is set at the mass flow controller 404. On the other hand, if this automatic manipulation cannot be executed normally, the result in step S21 is "NO" and a message indicating abnormality is displayed on a cell in the "Determination" column corresponding to this inspection item (step S13).

Figure 26:
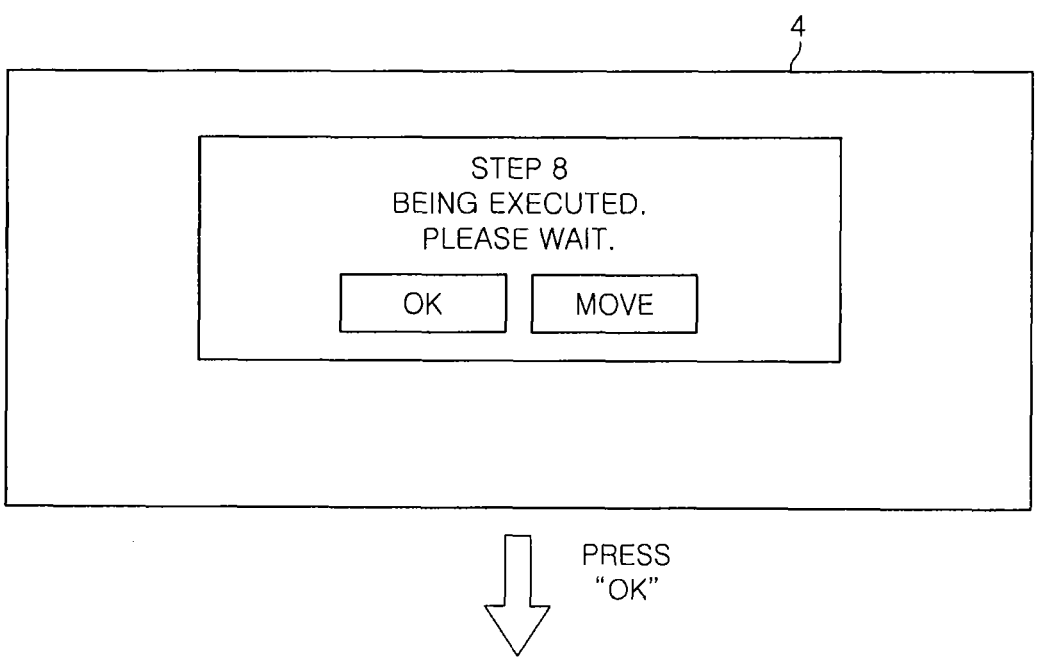
FIG. 26 is a schematic view showing an example screen displayed during the program execution.

On the screen of FIG. 26, if the "OK" button is pressed or this screen disappears automatically, the result in step S21 becomes "YES" and the ninth inspection item having a content of "Check whether the gas has flown into the gas line 4 at the set flow rate" is read out in step S9. Since this inspection item is an automatic check item, it is processed in the same manner as described in the case of the second inspection item.

To be specific, the result in step S10 is "YES" and it is determined by the control unit 100 whether the flow rate detected by the mass flow controller 404 coincides with the set flow rate (maximum flow rate) (step S16). If the detection value is found to coincide with the set value, the result in step S17 is "YES" and a message of "Normal" indicating normal termination is displayed on a cell in the "Determination" column of FIG. 20 (step S15). At the same time, the detected value of the gas flow rate is displayed on a cell in the "Detection Value" column on the right side of the corresponding inspection item. On the other hand, if the value detected by the mass flow controller 404 is found not to coincide with the set flow rate, the result in step S17 is "NO" and a message indicating abnormal terminal is displayed on the corresponding cell in the "Determination" column shown in FIG. 20.

Figure 27:
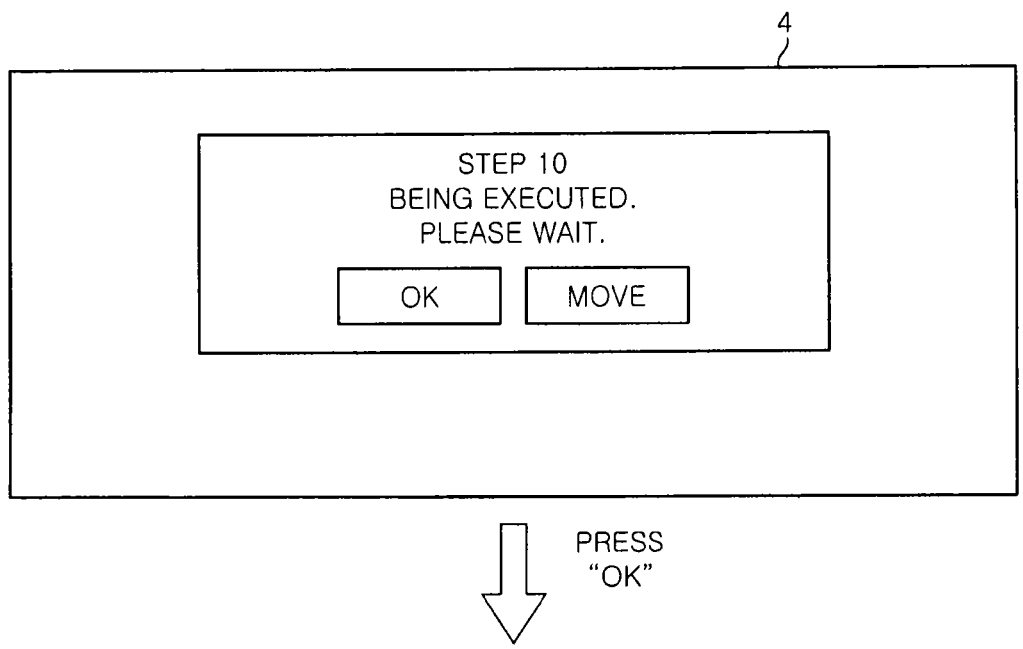
FIG. 27 is a schematic view showing an example screen displayed during the program execution.

Thereafter, the tenth inspection item is read out in step S9. This inspection item is an automatic manipulation item having a content of "Set flow rate of gas line 4 to be zero and close valve." Accordingly, the result in step S6 becomes "YES". Then, a pop-up window as shown in FIG. 27 is displayed, and the control unit 100 outputs a control signal for closing the valves 405 and 406 and setting the set flow rate of the mass flow controller 404 to be zero (step S7). In case that the manipulation is not normally terminated, the result in step S21 becomes "NO" and a message indicating abnormal termination is displayed on the corresponding cell in the "Determination" column shown in FIG. 20 (step S13).

On the other hand, if the result in step S21 is "YES" and the tenth inspection item is normally terminated, the pop-up window of FIG. 27 disappears automatically, and a message of "Normal" indicating normal termination is displayed on the corresponding cell in the "Determination" column of FIG. 20. Since the tenth inspection item is the last inspection item, the result in step S8 becomes "YES". Further, if a batch mode is not set, the result in step K1 becomes "NO" and the series of inspection processes are terminated. Then, a message of "Normal" is displayed on a cell in the "Determination" column on the right side of the inspection set of "No. 41-2" of FIG. 19.

In this example, on the screen of FIG. 19, a switch of "Batch execution" may be pressed. Then, by pressing "Select all inspection sets" or "Execute selected inspection set" on the screen of FIG. 16, multiple inspection items may be consecutively executed in a batch mode. In such a case, by pressing "Skip abnormal termination" or "Skip normal termination", inspection sets found to be abnormal or inspection sets already terminated normally can be skipped. Further, in this example, the inspection can be stopped as in the same manner as described in the above example.

What is claimed is:

1. A semiconductor manufacturing system comprising:
a semiconductor manufacturing apparatus;
circuitry configured to output a control signal for controlling the semiconductor manufacturing apparatus, the circuitry including a storage unit that stores a plurality of inspection sets for inspecting the semiconductor manufacturing apparatus, each of the inspection sets a multiplicity of inspection items each of which has a manipulation item or a check item;
a display configured to display a screen for inputting an instruction for an inspection operation and checking the inspection operation; and
a detector configured to detect a detection result corresponding to the check item and to send the detection result to the circuitry,
wherein each of the inspection items stored in the storage unit has a manipulation item having an automatic execution attribute, a manipulation item having a manual execution attribute, a check item having the automatic execution attribute, or a check item having the manual execution attribute, wherein the circuitry is configured to:

display a screen for selecting one of the inspection sets;

retrieve inspection items, which belong to the selected one of the inspection sets, arrange the retrieved inspection items in the order of workflow, and display each of the retrieved inspection items on a screen along with the corresponding automatic or manual execution attribute;

receive an inspection start command and read out, from the storage unit, the first inspection item among the retrieved inspection items that are arranged in order, wherein the circuitry is configured to execute, during a maintenance of the semiconductor manufacturing apparatus, one of the following steps (a) to (d) until there remains no more next inspection item:

(a) when the read-out inspection item is the manipulation item having the automatic execution attribute, outputting a command for implementing an operation corresponding to the manipulation item to a manipulation target device and reading out a next inspection item among the retrieved inspection items from the storage unit;

(b) when the read-out inspection item is the manipulation item having the manual execution attribute, displaying a screen for receiving an input indicating that the corresponding manipulation item has been executed by a user and reading out a next inspection item among the retrieved inspection items from the storage unit by receiving the input;

(c) when the read-out inspection item is the check item having the automatic execution attribute, automatically executing the check item based on the detection result of the corresponding check item from the detector and displaying a checkup result on the screen on which the retrieved inspection items are displayed in a corresponding relationship with the check item and, when the checkup result is normal and there exists a next inspection item, reading out the next inspection item from the storage unit; and (d) when the read-out inspection item is the check item having the manual execution attribute, displaying a screen for receiving an input of determining whether a checkup result is normal or abnormal, displaying a screen showing the inputted checkup result in a corresponding relationship with the check item, and, when the inputted checkup result is normal and there exists a next inspection item, reading out the next inspection item from the storage unit.

2. The semiconductor manufacturing system of claim 1, wherein the screen in the step (b) is for receiving an input indicating that the manipulation item has been executed by the user and further indicating that a check item according to the corresponding manipulation item has been checked up, and the next inspection item is read out among the retrieved inspection items from the storage unit by receiving the input indicating that the manipulation item has been executed by the user and further indicating that a check item according to the corresponding manipulation item has been checked up.

3. The semiconductor manufacturing system of claim 1, wherein the screen for receiving the input indicating that the manipulation item has been executed by the user in the step (b) and the screen for receiving the input of determining whether the checkup result is normal or abnormal in the step (d) are displayed on a pop-up window.

4. The semiconductor manufacturing system of claim 2, wherein the screen for receiving the input indicating that the manipulation item has been executed by the user in the step (b) and the screen for receiving the input of determining whether the checkup result is normal or abnormal in the step (d) are displayed on a pop-up window.

5. The semiconductor manufacturing system of claim 1, wherein, in the step (c), when the checkup result is abnormal, inspection items belonging to another one of the inspection sets, which is previously set, are read out from the storage unit and arranged in order and, then, the respective steps are executed.

6. The semiconductor manufacturing system of claim 2, wherein, in the step (c), when the checkup result is abnormal, inspection items belonging to another one of the inspection sets, which is previously set, are read out from the storage unit and arranged in order and, then, the respective steps are executed.

7. The semiconductor manufacturing system of claim 3, wherein, in the step (c), when the checkup result is abnormal, inspection items belonging to another one of the inspection sets, which is previously set, are read out from the storage unit and arranged in order and, then, the respective steps are executed.

8. The semiconductor manufacturing system of claim 4, wherein, in the step (c), when the checkup result is abnormal, inspection items belonging to another one of the inspection sets, which is previously set, are read out from the storage unit and arranged in order and, then, the respective steps are executed.

* * * * *